United States Patent
Swayne et al.

(10) Patent No.: US 10,529,208 B2
(45) Date of Patent: *Jan. 7, 2020

(54) DEVICE TRACKING SYSTEMS AND METHODS

(71) Applicant: Swaywin, LLC, Madison, AL (US)

(72) Inventors: Tracy Lynn Baldwin Swayne, Madison, AL (US); Jeffrey Scott Swayne, Madison, AL (US); Donathan Eugene Hutchings, Hartselle, AL (US)

(73) Assignee: Swaywin LLC, Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,087

(22) Filed: Jul. 12, 2018

(65) Prior Publication Data

US 2018/0365954 A1 Dec. 20, 2018

Related U.S. Application Data

(63) Continuation-in-part of application No. 15/934,840, filed on Mar. 23, 2018.
(Continued)

(51) Int. Cl.
*G08B 1/08* (2006.01)
*G08B 13/24* (2006.01)
(Continued)

(52) U.S. Cl.
CPC ..... *G08B 13/2462* (2013.01); *G08B 13/1418* (2013.01); *H04W 84/12* (2013.01)

(58) Field of Classification Search
CPC ............ G08B 13/2462; G08B 13/1427; G08B 13/1418; G08B 13/14; G08B 21/0269; H04W 8/16; H04W 64/00; H04W 84/12
(Continued)

(56) References Cited

U.S. PATENT DOCUMENTS 9,466,212 B1 * 10/2016 Stumphauzer, II .... G08G 1/137
2006/0176524 A1 * 8/2006 Willrich ................ G06F 1/1616
358/474
(Continued)

*Primary Examiner* — Anh V La
(74) *Attorney, Agent, or Firm* — Dennen IP Law, LLC; Ann I. Dennen

(57) ABSTRACT

A device tracking system of the present disclosure has a theft tracking device that permanently secures to an item that has the propensity to be stolen, the theft tracking device has a theft tracking processor and a Wireless Fidelity (Wi-Fi) module, and the theft tracking processor receives ping data and in response transmits response data via the Wi-Fi module. The system also has a remote locator device that has a case and that has a plug for securing the remote locator device to a power receptacle. The remote locator device also has a remote locator processor and a Wi-Fi module, and the remote locator processor periodically transmits a ping to the theft tracking device and receives the response data from the theft tracking device. The processor further transmits data indicating that the theft tracking device is not responding via a network when a response is not received from the tracking device. The system also has at least one server comprising a server processor that is communicatively coupled to the remote locator device, and the server processor receives the data indicating that the theft tracking device is not responding. Further, the server processor transmits location data periodically that shows a location of the item and displays the location to a user.

9 Claims, 15 Drawing Sheets

Related U.S. Application Data

(60) Provisional application No. 62/477,660, filed on Mar. 28, 2017.

(51) Int. Cl.
*G08B 13/14* (2006.01)
*H04W 84/12* (2009.01)

(58) Field of Classification Search
USPC .............. 340/539.13, 539.1, 539.16, 539.17, 340/539.21
See application file for complete search history.

(56) References Cited

U.S. PATENT DOCUMENTS

| | | | |
|---|---|---|---|
| 2014/0139034 A1* | 5/2014 | Sankar ................... | H02J 17/00 307/104 |
| 2016/0005284 A1* | 1/2016 | Batra ..................... | G08B 25/10 340/572.1 |
| 2016/0111914 A1* | 4/2016 | Willard .................. | H02J 9/061 307/66 |

* cited by examiner

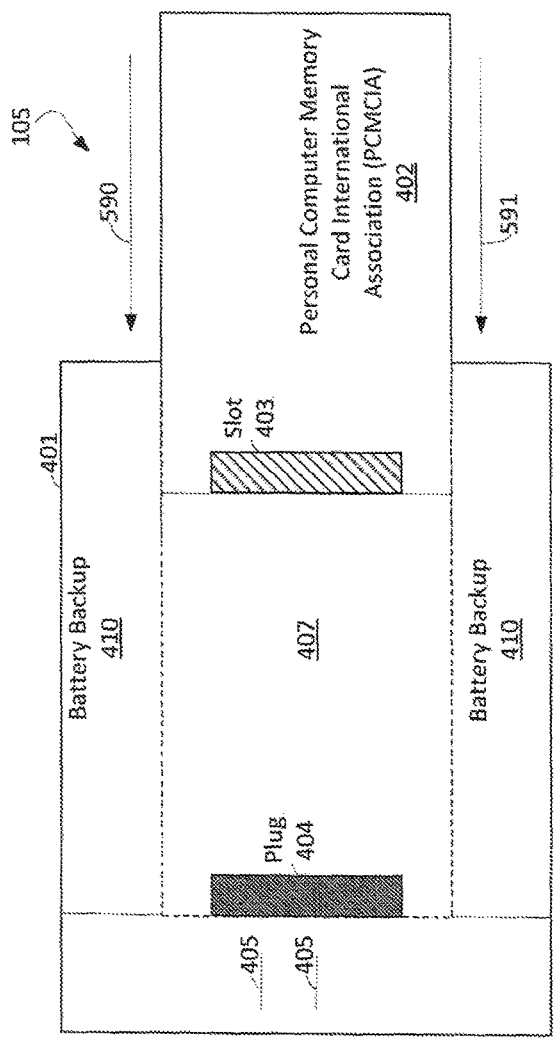
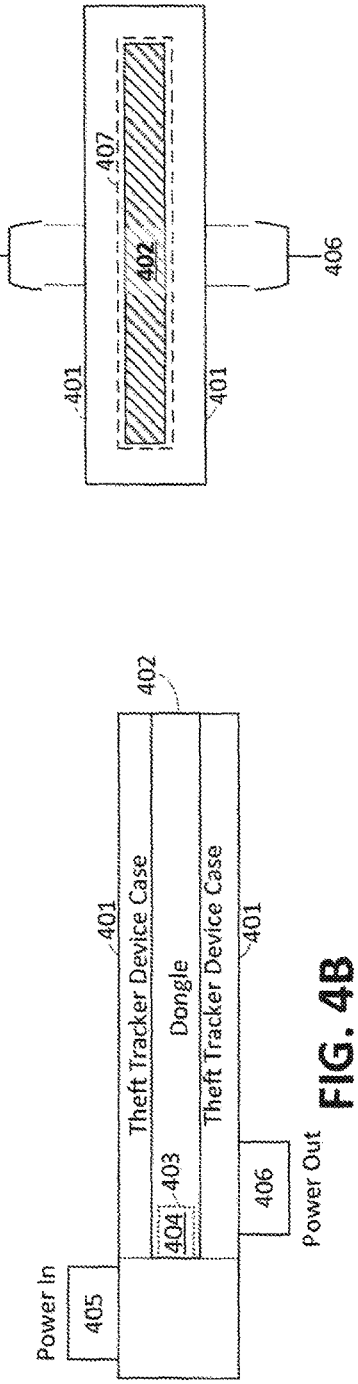
FIG. 4A
FIG. 4B
FIG. 4C

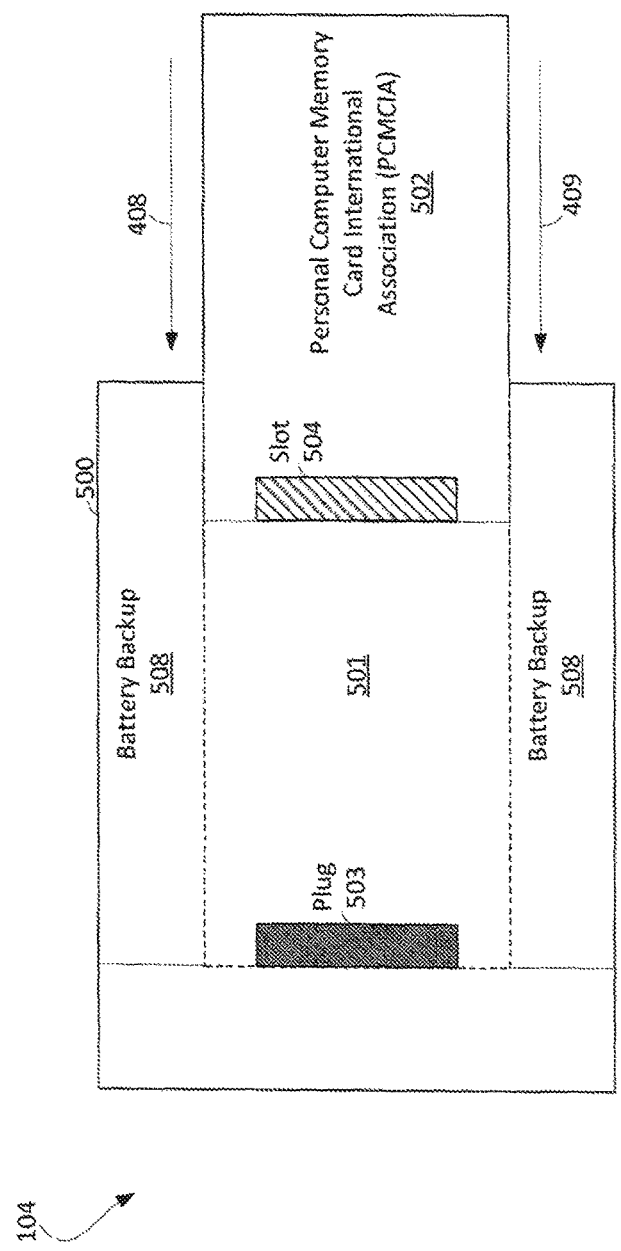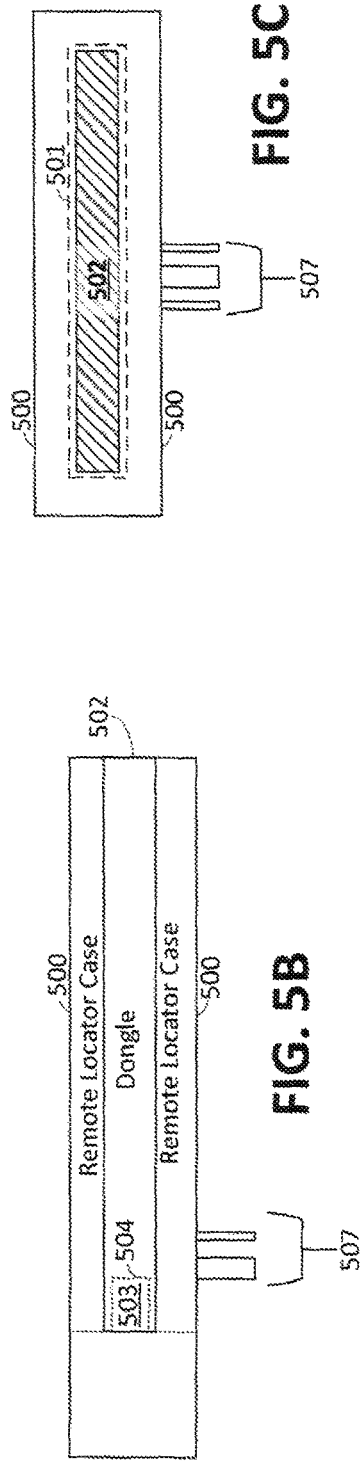

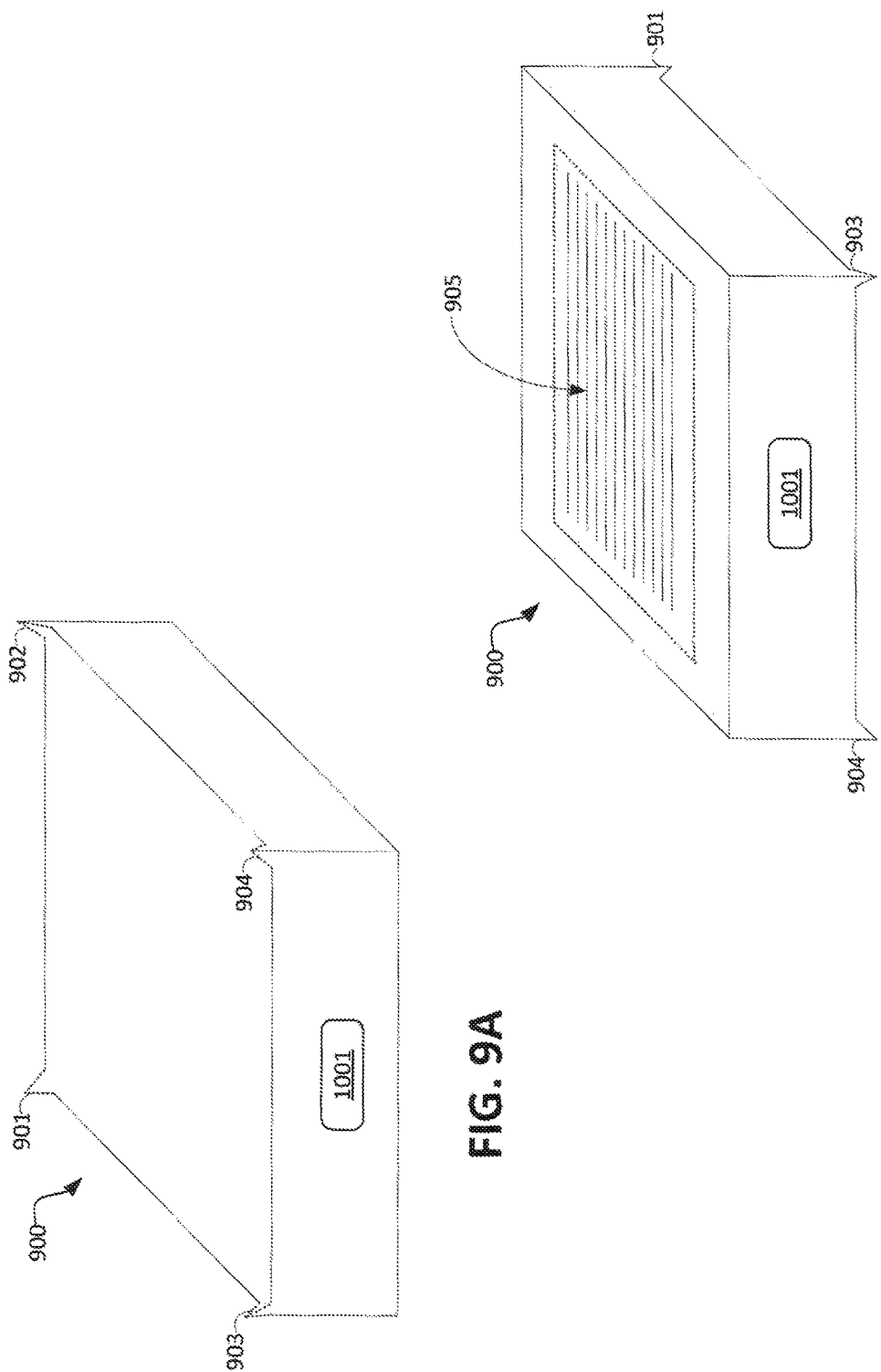

DEVICE TRACKING SYSTEMS AND METHODS

CROSS REFERENCE TO RELATED APPLICATION

This application is a continuation-in-part of and claims priority to U.S. patent application Ser. No. 15/934,840, entitled Device Tracking Systems and Methods and filed on Mar. 23, 2018, which is incorporated herein by reference, and which claims priority to U.S. Provisional Patent Application Ser. No. 62/477,660, entitled Device Tracking Systems and Methods and filed on Mar. 28, 2017.

BACKGROUND

Property crime results in losses estimated in the billion-dollar range with a very small recovery rate. It is highly estimated that burglary occurs frequently in the United States with a high percentage of burglaries occurring in home residences and businesses. Homes without security systems are more likely to be broken into and a low percentage of homes in the United States even have security systems. It is estimated that burglars typically spend no more than one (1) minute breaking into a home and fewer than ten (10) minutes inside.

Burglaries and theft continue to be a huge issue for law enforcement in the United States. Burglars are likely to study and select their targets. They tend to look for perceived affluence, opportunity, and low risk of confrontation and detection. This is true of residential and business properties.

The top six (6) items stolen during home burglaries include cash, jewelry, illegal drugs, electronics, prescription drugs, and clothing and shoes. Though some of the items on this list cannot be tracked, some of the higher-priced items on the list, e.g., electronics, can be tracked. The additional items on the list, as well as firearms, antiques, artwork, household goods, and miscellaneous items could be recovered when the offenders are arrested in possession of the stolen property.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 4A is a top view of an exemplary theft tracking device such as is depicted in FIG. 1 showing an exemplary Personal Computer Memory Card International Association (PCMCIA) card being inserted into a case.

FIG. 4B is a side view of the theft tracking device such as is depicted in FIG. 4A.

FIG. 4C is an end view of the theft tracking device such as is depicted in FIG. 4A.

FIG. 5A a top view of the remote locator device such as is depicted in FIG. 1 showing an exemplary PCMCIA card being inserted into a case.

FIG. 5B is a side view of the remote locator device such as is depicted in FIG. 5A.

FIG. 5C is an end view of the remote locator device such as is depicted in FIG. 5A.

FIG. 9A is a top view of another exemplary theft tracking device such as is depicted in FIG. 1.

FIG. 9B is a bottom view of the theft tracking device such as is depicted in FIG. 9A.

DETAILED DESCRIPTION

A theft tracking system in accordance with an embodiment of the present disclosure is multifaceted. The system comprises a remote locator, also known as a HUB, that is inserted into a wall receptacle, which communicates with a theft tracking device that is securely coupled to an item likely to be stolen. Further, the system comprises a server that communicates over a network (e.g., the Internet) with the remote locator. The system is configured such that when an item is removed from a predetermined known location, the remote locator communicates with the server indicating that the item has been removed, and the server informs the owner of the residence or business that the item is being moved from its predetermined location.

Figure 1:
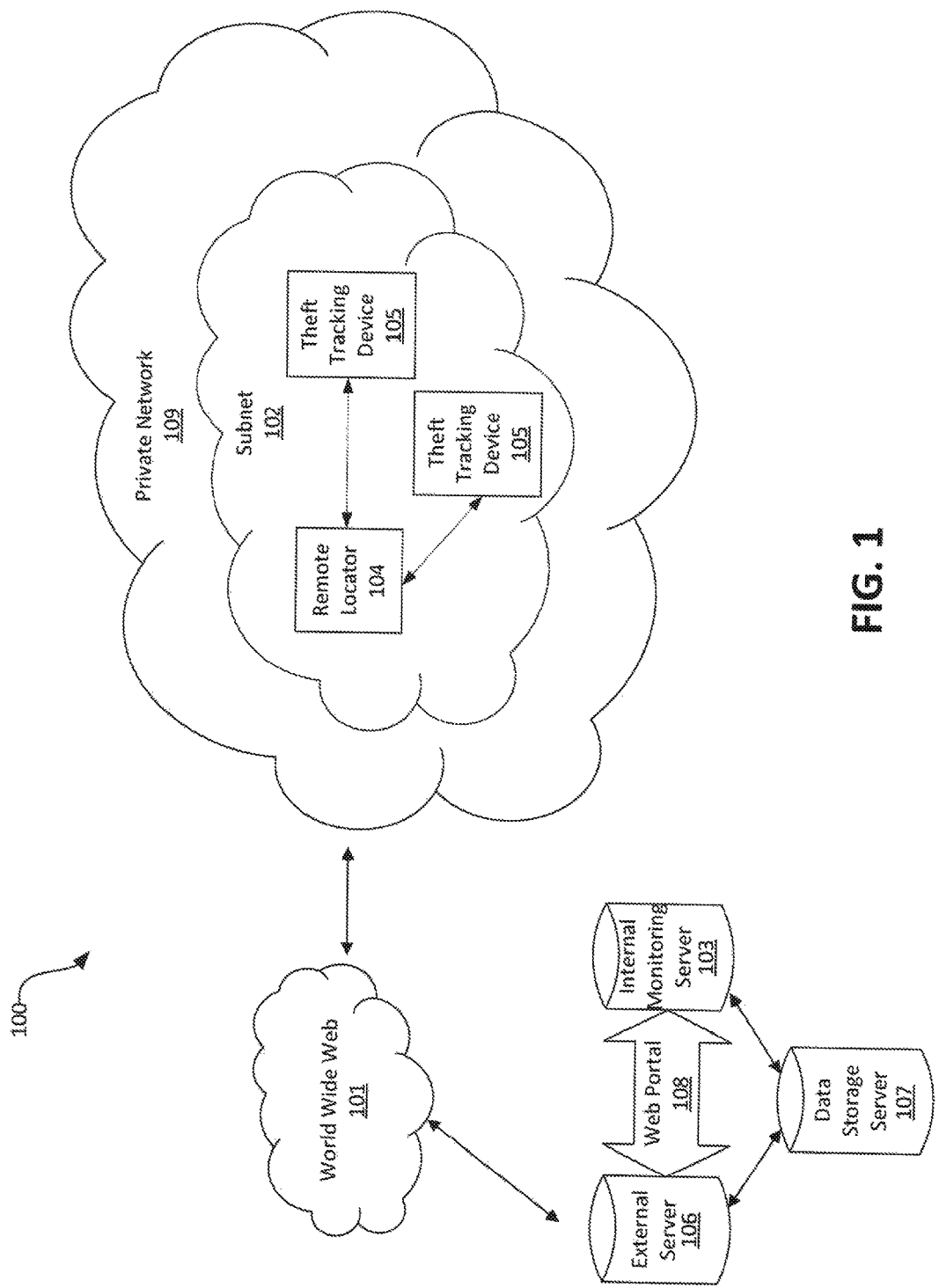
FIG. 1 is an exemplary theft tracking system in accordance with an embodiment of the present disclosure.

FIG. 1 is an exemplary theft tracking system 100 in accordance with an embodiment of the present disclosure. The theft tracking system 100 comprises an internal monitoring server 103, an external server 106, and a data storage server 107. Each server and its respective functionality are described further herein.

The theft tracking system 100 also comprises a subnet 102 that communicates with the external server 106 over a private network 109 via a Wide Area Network (WAN), known as the World Wide Web (WWW). Note that the private network 109 may be any type of network known in the art or future-developed, for example a Local Area Network (IAN), a Wide Area Network (WAN), a Wireless Local Area Network (WLAN), or a Small Area Network (SAN). In one embodiment, communication between the internal monitoring server 103 and the subnet 102 is effectuated via use of the WWW 101; however, communication may be effectuated by other means in other embodiments. The external server 106 communicates with the internal monitoring server 103 via a web portal 108, which communicatively couples the external server 106 with the internal monitoring server 103.

The internal monitoring server 103 is a computing device that controls various operations of the theft tracking system 100. As mere examples, the internal monitoring server 103 registers the remote locator 104 and the theft tracking devices 105 contained in the theft tracking subnet 102 (FIG. 1). In addition, the internal monitoring server 103 tracks, maintains, and reports the status of all the remote locators 104 and the theft tracking devices 105 within its purview.

The external server 106 is a computing device that controls other various operations of the system 100. In this regard, the external server 106 provides for a Web page where the customer registers its products. Types of data that a customer inputs into a registration Graphical User Interface (GUI) include: a name; an address; and the remote locator 104 serial number that the customer has purchased. Additionally, the customer enters theft tracker device serial numbers, descriptions, and known location of the theft tracking devices 105, e.g., data that describes in what room a tracked item resides. This input data is transmitted to the data storage server 107, which stores the data.

In addition, the external server 106 also provides for a Law Enforcement Officer (LEO) GUI. A LEO enters data into the GUI. Types of data entered include report numbers, badge numbers, names, and contact information. The contact information may be a cell number or an email address to which tracking data and messages can be sent. This data allows for the LEO to track and receive information of stolen property being tracked.

Note that in one embodiment, the email address is specific to a government agency, e.g., local police. Thus, to ensure that communication is with a valid government agency, the external server 106 may validate the address provided. For example, the internal monitoring server 103 through the external server 106 may transmit an email to the LEO that comprises a hypertext link. When the link is selected by the LEO, the external server 106 displays a GUI wherein the LEO can enter his/her identifying information. The external server 106 compares the data provided by the LEO to data stored corresponding to the email. If the identifying information is correct, the LEO is validated.

Note that in one embodiment, the external server 106 communicates with the data storage server 107. In such an embodiment, the external server 106 queries the data storage server 107 with a serial number, e.g., a remote locator 104 serial number or a theft tracking device 105 serial number, provided by the customer at registration. The data storage server 107 returns true or false to the external server 106 to indicate whether the serial number provided is valid. Further note that the external server 106 may also be configured to query the remote locator 104 to obtain serial numbers for the remote locator 104 and/or the theft tracking devices 105. Also, the external server 106 may also be configured to query the remote locator 104 of the cellular numbers and the internet protocol addresses of the theft tracking devices 105 communicatively coupled via Wireless Fidelity (Wi-Fi) to the remote locator 104, which are also displayed to the customer GUI (not shown) via hidden characters to prevent individuals from documenting the number allowing them to attempt to hack the system.

In addition, the external server 106 queries the data storage server 107 for encryption public key information for the remote locator 104 and the tracking devices 105. Note that the public key information is created by the remote locator 104 and the tracking devices 105 prior to sending data identifying the public key(s) to the external server 106. This information is also displayed in the GUI in hidden characters to prevent individuals from documenting the number allowing them to attempt to hack the system.

The data storage server 107 is communicatively coupled to the internal monitoring server 103 and the external server 106. The data storage server 107 stores data related to the theft tracking system 100. In one embodiment, the data storage server 107 communicates with the external server 106 for registration and communicates with the internal monitoring server 103 for confirming valid device messaging and encryption and/or decryption.

In this regard, the data storage server 107 stores the registration information described above regarding the customer. During registration by a customer, the external server 106 transmits the received data to the data storage server 107. The data storage server 107 verifies the remote locator 104 serial number to determine if it has been registered previously or if this is a first-time registration. After the remote locator 104 registration is completed, the external server 106 registers each of the attached theft tracker devices 105 through communication with the remote locator 104, as described above with reference to the external server 106.

The subnet 102 comprises a remote locator 104 that communicates with the external server 106 via a transfer protocol, Hypertext Transfer Protocol Secure (HTTPS). Further, the remote locator 104 communicates via the WWW 101 using the HTTPS.

The subnet 102 further comprises a plurality of theft tracking devices 105. Each theft tracking device 105 separately communicate with the remote locator 104. In this regard, each theft tracking device 105 communicates separately via Wi-Fi, which is a facility that allows the theft tracking devices 105 to communicate with the remote locator 104 wirelessly within a subnet 102 area. Also, the plurality of theft tracking devices 105 are coupled to various items (not shown) throughout the residence or business that may have the propensity to be stolen, e.g., televisions, computers, and the like.

In operation, after registration is completed, the remote locator 104 periodically transmits a signal to each of the tracking devices 105. During normal operation, each tracking device 105 sends a signal in response to the remote locator 104. This is oftentimes referred to as pinging a device. If the remote locator 104 does not receive a signal in return, it transmits a message to the external server 106 via the WWW 101, which in turn transmits the message to the internal monitoring server 103 via the Web portal 108.

In response to the message that the theft tracking device 105 is not responding, the internal monitoring server 103 "pings" the unresponsive theft tracking device 105. If the theft tracking device 105 responds to the internal monitoring server 103, the theft tracking device 105 performs a self-diagnostic test and transmits data indicative of the self-diagnostic test to the internal monitoring server 103 through the remote locator 104 and the external server 106.

If the theft tracking device 105 does not respond, the internal monitoring server 103 notifies the customer by text, email, or any other means of messaging. In this regard, the internal monitoring server 103 creates data indicative of a message to be sent to the customer.

Additionally, if the theft tracking device 105 does not receive a ping from the remote locator 104 it initiates its communications module. In this regard, the tracking device 105 turns on an on board cellular system. Additionally, the theft tracking device 105 initializes theft tracking logic and its Global Positioning System (GPS), which is described further herein.

If the theft tracking device 105 is in communication proximity of the remote locator 104, the theft tracking device 105 continues to ping the remote locator 104 and checks its location periodically. If the remote locator 104 does not receive a ping from the theft tracking device 105, the theft tracking device 105 contacts the internal monitoring server 103. The theft tracking device 105 provides the internal monitoring server 103 data indicative of the tracking device's status.

If the internal monitoring server 103 receives the status data from the theft tracking device 105, the internal monitoring server 103 contacts the customer and transmits a message via text, email, or any other type of messaging means. The message may state "The television in the master bedroom may have been stolen. Please select D to dismiss or T to track the item." If the customer selects the tracking option in response, the internal monitoring server 103 initiates tracking of the item that is out of range of the remote locator 104. If the customer responds to dismiss, the internal monitoring server 103 sends data indicative of dismissal to the theft tracking device 105. In response, the theft tracking device 105 shuts down its communications systems and returns to idle mode.

If the customer responds to track, the internal monitoring server 103 transmits a message to the customer to file a LEO report. Through a LEO GUI, described above, on the external server 106, the LEO may enter data indicative of a LEO report identification number assigned to the tracking order. Further, the LEO may provide, or data on the internal monitoring server 103 may indicate, a contact number and name to provide updates about the stolen property to LEOs only via Internet messaging, which is entered on the LEO GUI. LEOs may also use the GUI to transfer tracking data to another LEO Department/Agency. For example, if the tracked items travel outside one jurisdiction and enter another jurisdiction. Note that the information is confirmed with the designated LEOs. Customers do not receive tracking data.

Note that in one embodiment, the internal monitoring server 103 transmits a message to the LEO computing device, e.g., cell phone or computer, which was provided in LEO registration. This message may contain a hypertext link. When this hypertext link is selected, the external server 106 displays information to the LEO regarding the tracked item. In one embodiment, when the LEO selects the hypertext link, the external server 106 provides to the LEO an electronic map, e.g., Google Maps, and the location of the item is shown. Further, as the internal monitoring server 103 continues to receive new location information from the theft tracking device 105, the external server 106 continues to update the map as the item is moved.

While the internal monitoring server 103 is waiting for the LEO report or case number, the internal monitoring server 103 continues to monitor the location of the item to which the theft tracking device 105 is attached. In this regard, the theft tracking device 105 turns on its GPS system, extrapolates the latitude and longitude, date and time stamps the results, and transmits a message to the internal monitoring server 103 using encryption software. This message is sent through the WWW 101 to the internal monitoring server 103. The internal monitoring server 103 transmits a message to the theft tracking device 105 that the message is received, and it is logged into the message database on the data storage server 107.

At a set time interval, the theft tracking device 105 sends its location and additional data through the WWW 101 to the internal monitoring server 103. Note that this data may be sent via the Internet to the internal monitoring server 103. Once the theft tracking device 105 has not moved for a set duration of time, the theft tracking device 105 reports its location as a destination.

Upon identifying the location, the internal monitoring server 103 will send the LEO cell number or email address, a Web page for tracking data, or an Internet message for the LEO to respond with pre-selected options, e.g., sound an alarm, disable the tracked item through the theft tracking device 105, or verify its location. Thereafter, the LEO may respond by request alarm, report as found, continuing tracking, or close case file. If the LEOs respond report as found, or close case file, the theft tracking device 105 will terminate tracking and return to idle mode. If the LEO responds request alarm, the theft tracking device 105 will initiate a high-decibel alarm to notify the LEOs of its location. Additionally, the LEO may continue to track.

Figure 2A:
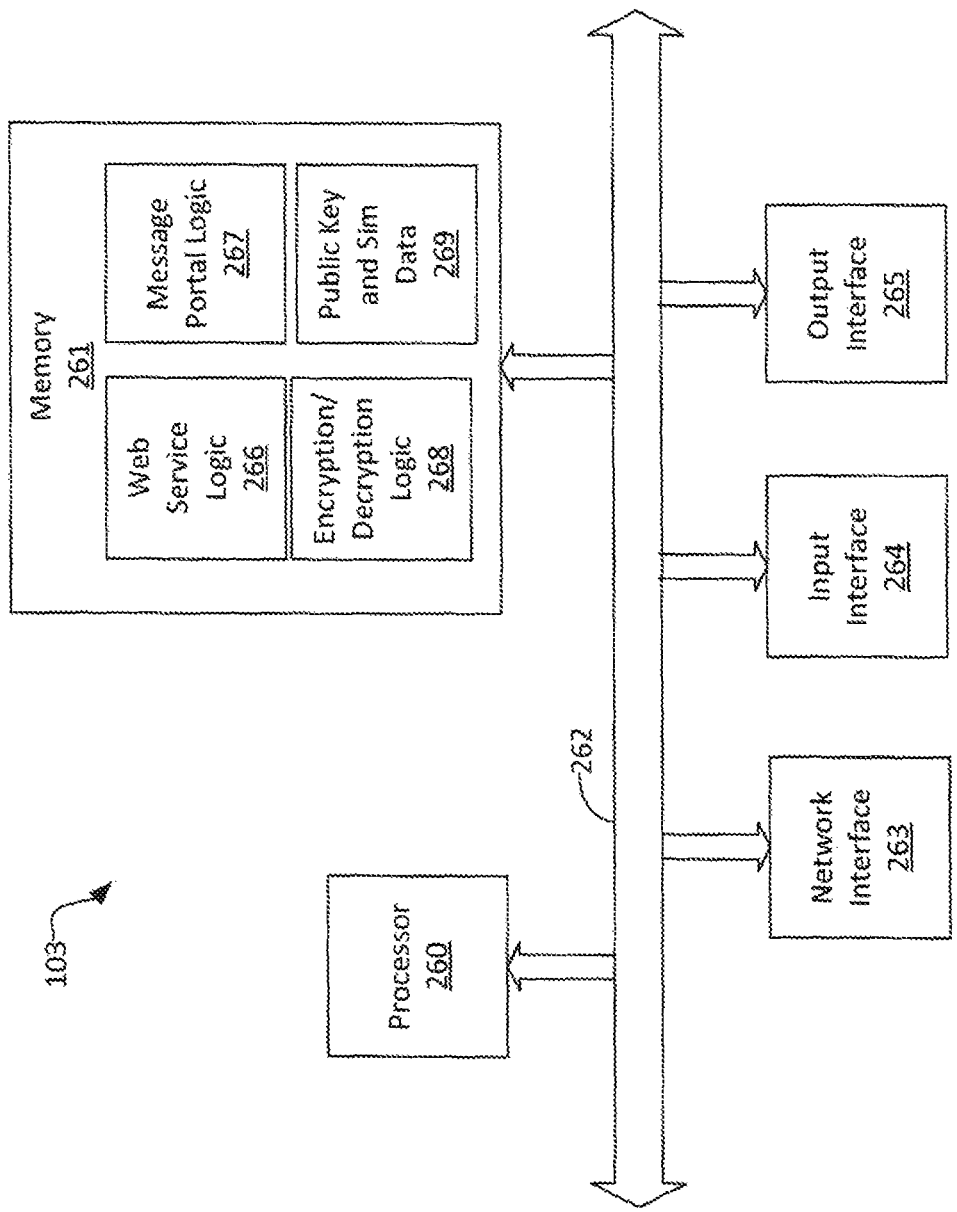
FIG. 2A is an exemplary internal monitoring server such as is depicted in FIG. 1.

FIG. 2A depicts an exemplary embodiment of the internal monitoring server 103 depicted in FIG. 1. As shown by FIG. 1, the internal monitoring server 103 comprises a processor 260, a network interface 263, encryption/decryption logic 268, public key and Subscriber Identity Module (SIM) data 269, and memory 261. Stored in memory 261 is Web service logic 266 for receiving messages and sending message. Further the internal monitoring server 103 comprises a message portal logic 267 that allows the internal monitoring server 103 to communicate with the remote locator 104. The Network interface 263 allows the internal monitoring server 103 to communicate with the data storage server 107.

The exemplary embodiment of the internal monitoring server 103 depicted by FIG. 2A comprises at least one conventional processing element 260, such as a Digital Signal Processor (DSP) or a Central Processing Unit (CPU), that communicates to and drives the other elements within the internal monitoring server 103 via a local interface 262, which can include at least one bus. Further, the processing element 260 is configured to execute instructions of software, such as the Web service logic 266, the message portal logic 267, or the encryption/decryption logic 268.

The Web service logic 266 and the message portal logic 267 generally control the functionality of the internal monitoring server 103, as will be described in more detail hereafter. It should be noted that the Web service logic 266 and the message portal logic 267 can be implemented in software, hardware, firmware or any combination thereof. In an exemplary embodiment illustrated in FIG. 2A, the Web service logic 266 and the message portal logic 267 are implemented in software and stored in memory 300.

Note that the Web service logic 266 and the message portal logic 267, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

An input interface 264, for example, a keyboard, keypad, or mouse, can be used to input data from a support/maintenance user of the internal monitoring server 103, and an output interface 265, for example, a printer or display screen (e.g., a Liquid Crystal Display (LCD)), can be used to output data to the user. In addition, a network interface 263, such as a Network Interface Card (NIC), enables the internal monitoring server 103 to communicate via the WWW 101 (FIG. 1) with the remote locator 104 and the data storage server 107.

In operation, as stated above, the internal monitoring server 103 communicates with the data storage server 107 and the remote locator 104. To effectuate secure communication, upon initialization, the remote locator 104 transmits a SIM identifier and a public key. Using the public key and SIM, the encryption/decryption logic 268 decrypts the message. Thereafter, when the remote locator 104 sends a SIM and a message, the message portal logic 267 can look up the public key based upon the SIM provided in the message and decrypt the message. The internal monitoring server 103 can then perform actions based upon the message received.

Further, to effectuate communication with the data storage server 107, the internal monitoring server 103 initially transmits identification information and a public key to the data storage server 107. The data storage server 107 stores the identification and the public key. Thereafter, when the internal monitoring server 103 receives a message, the data storage server 107 uses the identification to retrieve the public key and sends the key to the internal monitoring server 103. The internal monitoring server 103 can then use the stored public key to decrypt the message and perform actions based upon the message.

Figure 2B:
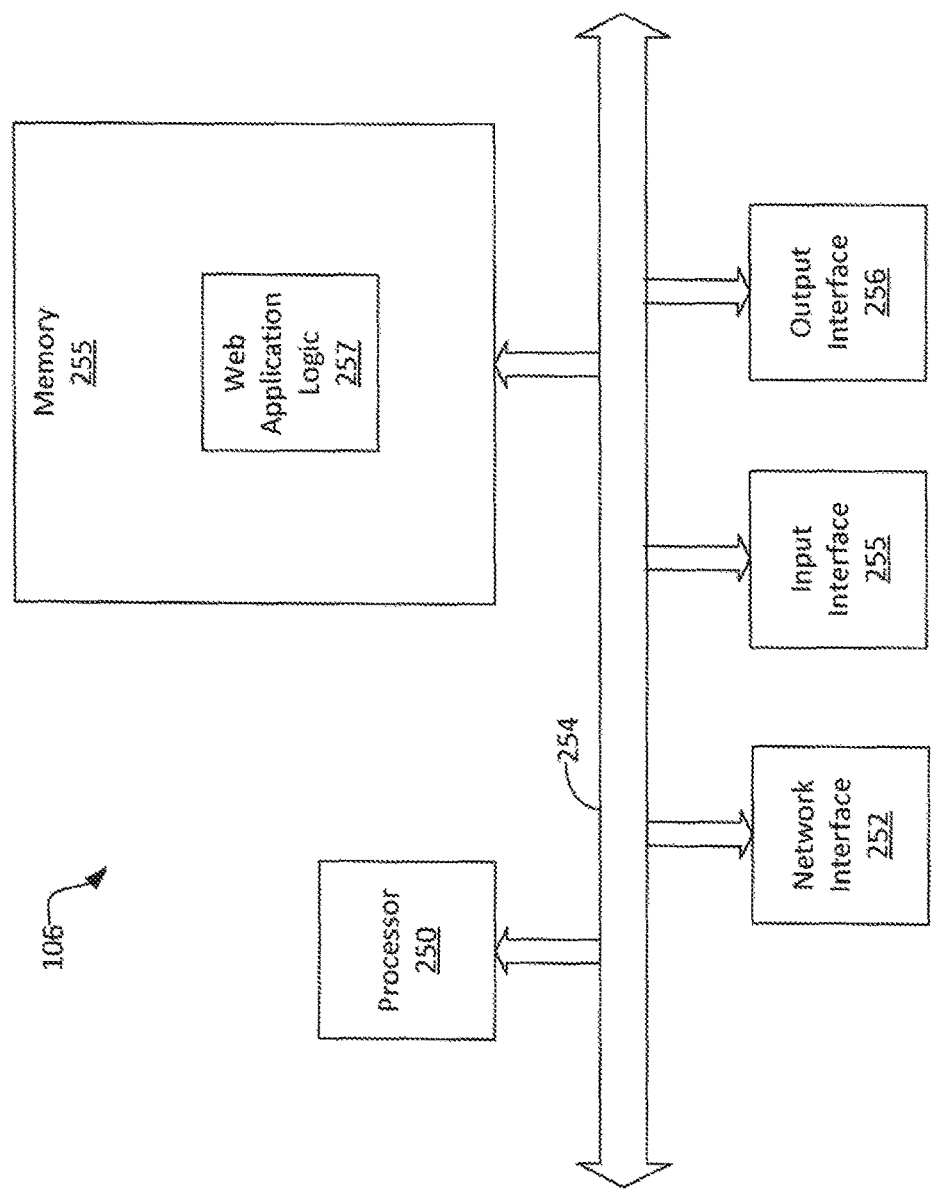
FIG. 2B is an exemplary external server such as is depicted in FIG. 1.

FIG. 2B depicts an exemplary embodiment of the external server 106. As shown by FIG. 1, the external server 106 comprises a processor 250, a NIC 252, and memory 255. Stored in memory 255 is Web application logic 257.

The exemplary embodiment of the external server 106 depicted by FIG. 2B comprises at least one conventional processing element 250, such as a DSP or a CPU, that communicates to and drives the other elements within the external server 106 via a local interface 254, which can include at least one bus. Further, the processing element 250 is configured to execute instructions of software, such as the Web application logic 257.

As indicated hereinabove regarding the external server 106, the external server 106 is responsible for receiving information related to registration and LEO information. In this regard, the Web application logic 257 displays respective GUIs and receives the information as described above. Further, the Web application logic 257 performs the serial number look-up implementation to the data storage server 107 to determine if the serial number provided by the customer corresponds to valid remote locators 104 (FIG. 1) and theft tracking devices 105 (FIG. 1).

An input interface 255, for example, a keyboard, keypad, or mouse, can be used to input data from a user of the external server 106, and an output interface 256, for example, a printer or display screen (e.g., an LCD), can be used to output data to the user. In addition, a network interface 252, such as a NIC, enables the external server 106 to communicate via the WWW 101 (FIG. 1) with the remote locator 104.

Figure 2C:
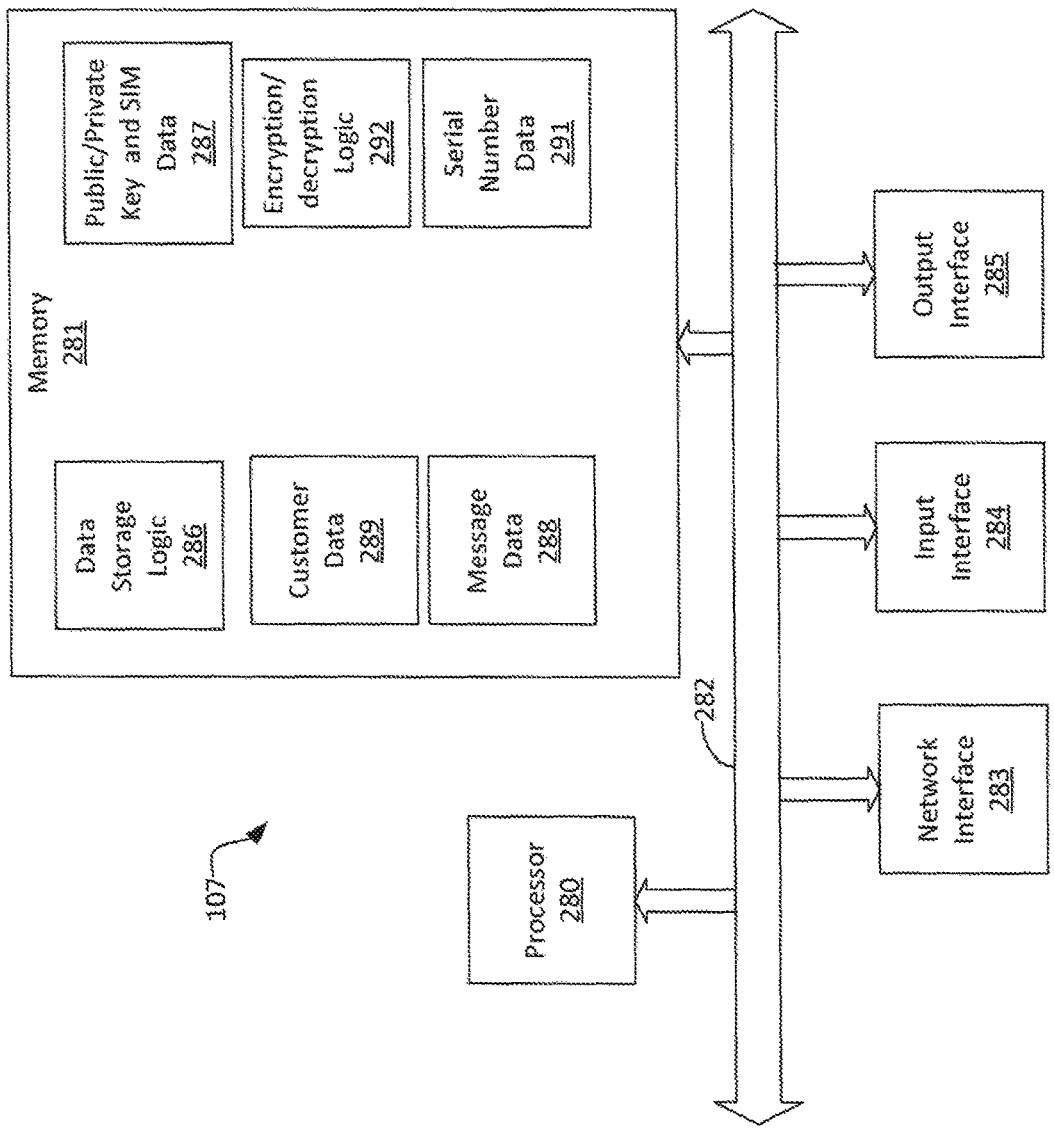
FIG. 2C is an exemplary data storage server such as is depicted in FIG. 1.

FIG. 2C depicts an exemplary embodiment of the data storage server 107. As shown by FIG. 2C, the data storage server 107 comprises a processor 280, a network interface 283, and memory 281. Stored in memory 281 are data storage logic 286, public key and SIM data 287, customer data 289, message data 288, and serial number data 291.

The data storage logic 286 generally controls the functionality of the data storage server 107, as will be described in more detail hereafter. It should be noted that the data storage logic 286 can be implemented in software, hardware, firmware or any combination thereof. In an exemplary embodiment illustrated in FIG. 2C, the data storage logic 286 is implemented in software and stored in memory 300.

Note that the data storage logic 286, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the data storage server 107 depicted by FIG. 2C comprises at least one conventional processing element 280, such as a DSP or a CPU, that communicates to and drives the other elements within the data storage server 107 via a local interface 282, which can include at least one bus. Further, the processing element 280 is configured to execute instructions of software, such as the data storage logic 286.

The customer data 289 is any data related to a customer that has been input on the GUI described above with reference to the discussion related to FIG. 2B. This customer data 289 consists of a customer's name, address, remote locator serial number, and other personal data. Additionally, the customer data 289 consists of theft tracking device 105 serial number, cell number, IP address, and other data as necessary.

The data storage server 107 communicates with the internal monitoring server 103 when queried. To effectuate secure communication, upon initialization, the remote locator 104 transmits a SIM identifier and a public key to the internal monitoring server 103. The data storage logic 286 stores the SIM correlated with the public key in the public/private key and SIM data 287. Thereafter, when the remote locator 104 sends its SIM ID and a message, the internal monitoring server 103 queries the data storage server 107 for the public key. The internal monitoring server 103 sends the original message received to the data storage server 107 and stores the original message as message data 288.

The data storage server 107 communicates with the external server 106 when queried. In this regard, upon registration, the remote locator 104 transmits a SIM and public key for the remote locator 104 and any theft tracking devices 105 coupled to the remote locator 104. The external server 106 sends the data to the data storage server 107 which stores this data relationally in the public key and SIM data. Thus, if a message is sent from the remote locator 104, the external server 106 queries the data storage server 107 for the public key. The external server 106 sends the original message received from the remote locator 104 and acts on the message, if necessary. Also, as described above, the original message will be stored as message data 288.

The serial number data 290 consists, which may be relationally cross-referenced with the SIM and public key data 287, of a list of every serial number of every remote locator 104 and theft tracking device 105 manufactured. During registration, the data storage logic 286 may look up a serial number provided by a customer in a GUI on external server 106 to determine that it is a valid serial number. In response, the data storage logic 286 may transmit a message back to the external server 106 to let the external server 106 determine that it is a valid or invalid registration.

An input interface 284, for example, a keyboard, keypad, or mouse, can be used to input data from a user of the external server 106, and an output interface 285, for example, a printer or display screen (e.g., an LCD), can be used to output data to the user. In addition, a network interface 283, such as a modem, enables the external server 106 to communicate via the WWW 101 (FIG. 1) with the remote locator 104 and the internal monitoring server 103.

Figure 3A:
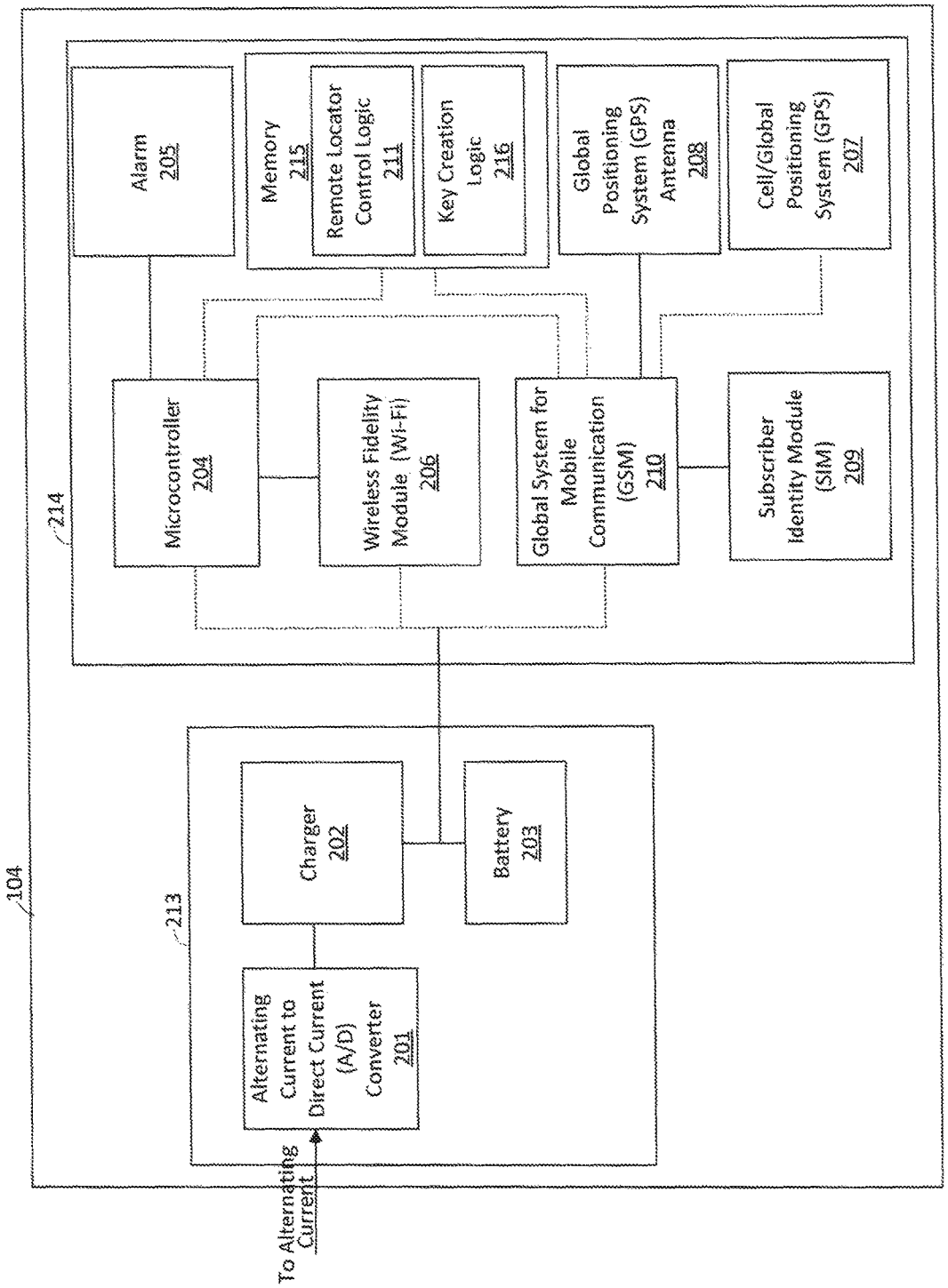
FIG. 3A is an exemplary remote locator device as is depicted in FIG. 1.

FIG. 3A is a block diagram of an exemplary remote locator 104. The remote locator 104 comprises a power module 213 and a communication module 214.

The power module 213 comprises a charger 202, a battery 203, and an Alternating Current to Direct Current (AC/DC) converter 201. In operation, the AC/DC converter 201 is coupled to an alternating current source, which receives power. The power received charges the charger 202 and the charger charges the battery 203. The power module 213 provides power to the communication module 214.

If power is lost to the remote locator 104, the remote locator 104 immediately switches to battery backup 203. The remote locator 104 pings the theft tracking devices 105 to determine if the theft tracking devices 105 are on battery backup power as well. Note that the most common cause would be power loss to the building.

When on battery backup, the remote locator 104 reports the status to the internal monitoring server 103, and the internal monitoring server 103 may notify the customer via text, or the like, that power has been lost to the remote locator 104 and the theft tracking devices 105. While on battery backup, the remote locator runs self-diagnostics to determine the source of the power loss. This information may be reported to the internal monitoring server 103.

The remote locator 104 then checks its location via the GPS 207. If the remote locator 104 is moving from its designated location, tracking mode is initiated and the communication module 214 begins to operate by obtaining location information and reporting the location information to the internal monitoring server 103, which tracks the remote locator 104 as described herein above. If the remote locator 104 is not moving, the remote locator 104 rechecks its position periodically. Details regarding the communication are provided herein.

The communication module 214 comprises a microcontroller 204 that controls the other elements on the communication module 214. The microcontroller is at least one conventional processing element, such as a DSP or a CPU that communicates to and drives the other elements within the communication module 214 via various buses. Further, the microcontroller 204 is configured to execute instructions of software, such as the remote locator control logic 211 and the key creation logic 215.

The communication module 214 further comprises remote locator control logic 211 and key creation logic 215. Note that the remote locator logic 211 and the key creation logic 215 are executed by the microcontroller 204.

Communication module 214 further comprises a Wi-Fi module 206, a Global System for Mobile Communication (GSM) 210, a SIM 209, an audible alarm 205, a GPS antenna 208, a cell/GPS 207, and memory 215.

The SIM card 209 is the access control card for the GSM 210. Note that the remote locator logic 211 creates messages and directs the messages to the appropriate receiver through the SIM card 209 when the messages are sent through the GSM. Otherwise, the remote locator logic 211 directs messages through the Internet.

The Wi-Fi module 206 is a self-contained system that comprises its own transmission control protocol/internet protocol that may be activated and controlled by the microcontroller 204. The Wi-Fi allows the remote locator 104 to wirelessly connect with other devices also equipped with Wi-Fi. In the present disclosure, the Wi-Fi module 206 enables the remote locator 104 to wirelessly communicate and send messages to the theft tracking device 105. As an example, the Wi-Fi module 206 transmits a ping to the theft tracking device 105 to determine whether the item to which the theft tracking device 105 has been moved from its original location. As described above, if the theft tracking device 105 follows with a ping, then there appears to be no problem. Note that during operation, the remote locator logic 211 via the microcontroller activates the Wi-Fi module.

The SIM 209 contains unique information that identifies the remote locator 104. This allows the remote locator 104 to use communication features on the communication module 214. Types of information stored on the SIM 209 may include a mobile phone number. As indicated above, the communication module 214 comprises a GSM 210. Thus, the GSM 210 may use the information on the SIM 209 to communicate to, or text a mobile phone number identified in the GSM.

Additionally, the communication module 214 comprises a cell/GPS 207. The GPS 207 transmits data to the GSM 210 with location information obtained from a GPS antenna 207. Thereafter, the remote locator 104 communicates data indicative of the exact location of the remote locator 104 to the internal monitoring server 103, as described with reference to FIG. 1. The internal monitoring server 103 communicates with a customer by transmitting a message via text or email, wherein the message sent contains the data described herein with reference to FIG. 1. Note that the data indicative of any message received is stored on the data storage server 107. Further, the remote locator logic 211 may generate a message containing this information and transmit the information to the Wi-Fi module 206. The Wi-Fi module 206 may then send this information to the remote locator 104, which can transmit this information over the WWW 101 to the internal monitoring server 103 as a message.

As noted above, communication throughout the theft tracking system 100 is encrypted. Thus, the key creation logic 216 creates a public key and a private key. Upon initialization, the remote locator control logic 211 transmits the created public key and a SIM to the internal monitoring server 103. The SIM identifier will be used by the internal monitoring server 103 to verify the remote locator 104 that transmitted the data, which is described hereinabove.

Note that the alarm is configured to make a sound. This sound may be initiated by LEOs through the LEO GUI. This will aid in the location of the item being tracked.

Figure 3B:
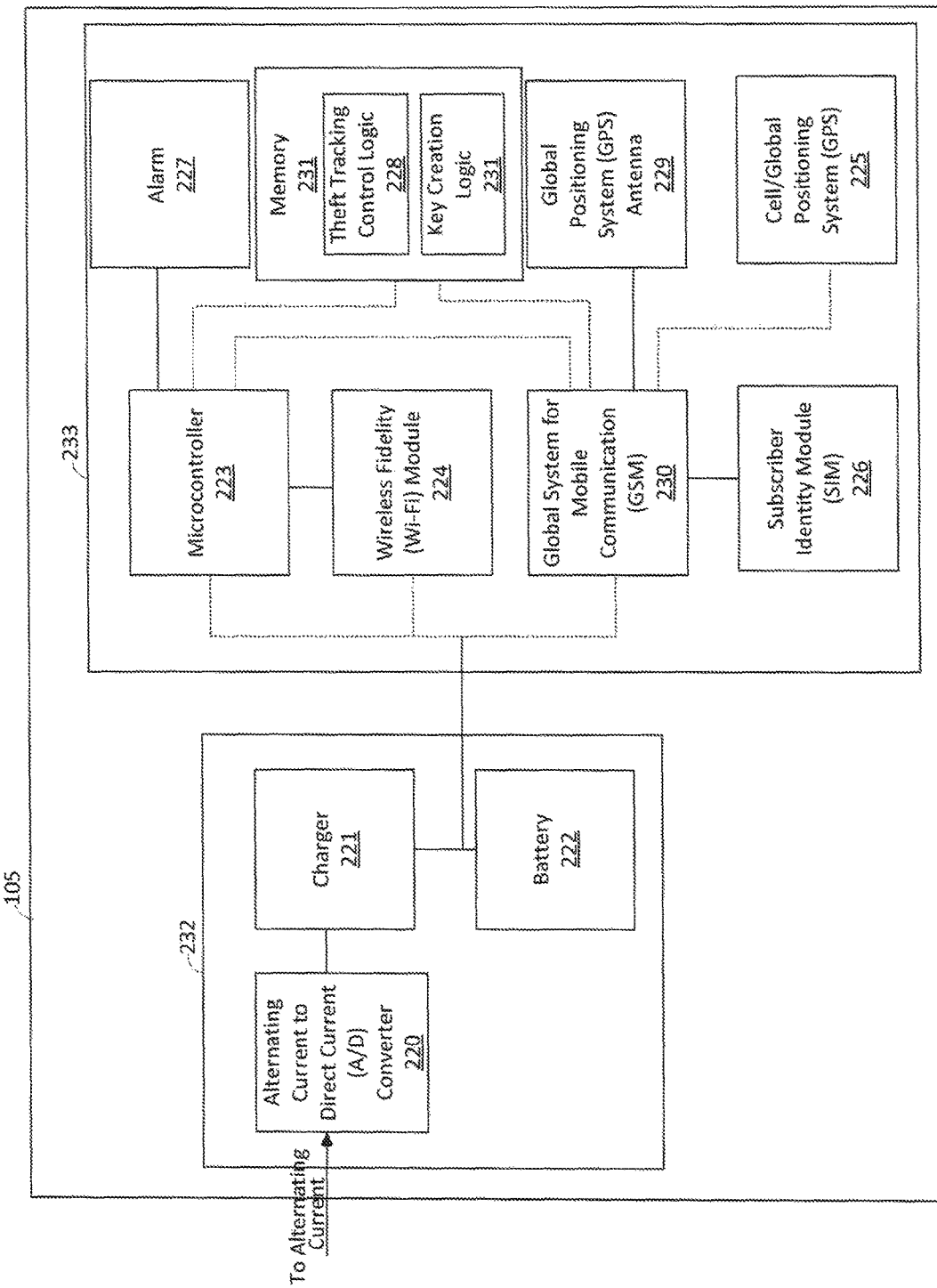
FIG. 3B is an exemplary theft tracking device such as is depicted in FIG. 1.

FIG. 3B is a block diagram of an exemplary theft tracking device 105. The theft tracking device 105 is a separate device than the remote locator 104 and communicates over the subnet 102 (FIG. 2) with the remote locator 104. The theft tracking device 105 comprises a power module 232 and a communication module 233.

The power module 232 comprises a charger 221, a battery 222, and an AC/DC converter 220. In operation, the AC/DC converter 220 is coupled to an alternating current source, which receives power. The power received charges the charger 221 and the charger charges the battery 222. The power module 232 provides power to the communication module 233.

If power is lost to the theft tracking device 105, the theft tracking device 105 immediately switches to battery backup 222. The theft tracking device 105 pings the remote locator 104 to determine if the remote locator 104 is on battery backup power as well and is in the predetermined range of the theft tracking device 105.

If the remote locator 104 is in range of the theft tracking device 105, the theft tracking device 105 continues to contact the remote locator 104 periodically. If the remote locator 104 is not within range of the theft tracking device 105, the theft tracking device 105 initiates its cell system and contacts the internal monitoring server 103 via Internet messaging with the theft tracking device's 105 status and location.

Further, the theft tracking device 105 performs self-diagnostics to determine the source of a problem on the theft tracking device 105. The theft tracking device 105 contacts the internal monitoring server 103 with its status via its cell system using internet messaging protocols.

Additionally, the internal monitoring server 103 contacts the customer to request to track or disregard theft tracking device 105. If the customer chooses to disregard, the internal monitoring server 103 sends a message to the theft tracking device 105 to go into idle mode. Also, the message directs the theft tracking device 105 to recharge the battery once power is re-established.

If the customer chooses to track the theft tracking device 105, the internal server 103 initiates messaging with the theft tracking device 105 to initiate tracking mode. The internal server 103 contacts the customer requesting that the customer contact LEOs and file a theft/LEO report. Once the report is filed, a case number and a contact point/phone number for LEOs is obtained so that the theft tracking system 100 can communicate with LEOs on the location of the items that may have been stolen.

When on battery backup, the theft tracking device 105 reports the status to the internal monitoring server 103 and the internal monitoring server 103 may notify the customer via text, or the like, that power has been lost to the remote locator 104 and the theft tracking devices 105. While on battery backup, the theft tracking device 105 runs self-diagnostics to determine the source of the power loss. This information may be reported to the internal monitoring server 103.

The theft tracking device 105 then checks its location via the GPS 207. If the theft tracking device 105 is moving from its designated location, tracking mode is initiated and the communication module 233 begins to operate by obtaining location information and reporting the location information to the internal monitoring server 103, which tracks the remote locator 104 as described hereinabove. If the theft tracking device 105 is not moving, the remote locator 104 rechecks its position periodically. Details regarding the communication are provided herein.

The communication module 233 comprises a microcontroller 223 that controls the other elements on the communication module 233. The microcontroller 223 is at least one conventional processing element, such as a DSP or a CPU that communicates to and drives the other elements within the communication module 233 via various buses. Further, the microcontroller 223 is configured to execute instructions of software, such as the theft tracking device control logic 228 and the key creation logic 231.

The communication module 233 further comprises theft tracking device control logic 228 and key creation logic 231. Note that the theft tracking device control logic 228 and the key creation logic 231 comprise instructions that are executed by the microcontroller 204.

Communication module 233 further comprises a Wi-Fi module 224, a GSM 230, a SIM 226, an audible alarm 227, a GPS antenna 229, a cell/GPS 225, and memory 231.

The SIM card 226 is the access control card for the GSM 230. Note that the theft tracking control logic 228 creates messages and directs the messages to the appropriate receiver through the SIM card 226 when the messages are sent through the GSM. Otherwise, the theft tracking control logic 228 directs messages through the Wi-Fi module 224.

The Wi-Fi module 224 is a self-contained system that comprises its own transmission control protocol/internet protocol that may be activated and controlled by the microcontroller 223. The Wi-Fi allows the theft tracking device 105 to wirelessly connect with other devices also equipped with Wi-Fi. In the present disclosure, the Wi-Fi module 224 enables the theft tracking device 105 to wirelessly communicate and send messages to remote locator 104. As an example, the Wi-Fi module 224 transmit a ping to the theft tracking device 105 to determine whether the item to which the theft tracking device 105 has been moved outside the range of its original location. As described above, if the theft tracking device 105 follows with a ping, then there appears to be no problem. Note that during operation, the theft tracking device control logic 228 via the microcontroller 223 activates the Wi-Fi module.

The SIM 226 contains unique information that identifies the theft tracking device 105. This allows the theft tracking device 105 to use communication features on the communication module 233. Types of information stored on the SIM 226 may include a mobile phone number. As indicated above, the communication module 233 comprises a GSM 230. Thus, the GSM 230 may use the information on the SIM 226 to communicate to or text a mobile phone number identified in the GSM.

Additionally, the communication module 233 comprises a cell/GPS 229. The GPS 229 transmits data to the GSM 230 with location information obtained from a GPS antenna 225. Thereafter, the theft tracking device 105 transmits data indicative of the exact location of the theft tracking device 105 to the internal server 103. In this regard, the theft tracking device control logic 228 generates a message containing this information and transmits the message to the Wi-Fi module 224. In response, the Wi-Fi module 224 then sends this message to the remote locator 104, which can transmit this information over the WWW 101 to the internal monitoring server 103 as a message.

As noted above, communication throughout the theft tracking system 100 is encrypted. Thus, the key creation logic 231 creates a public key and a private key. Upon initialization, the theft tracking device control logic 228 transmits the created public key and a SIM to the internal monitoring server 103 via the remote locator 104. The public key may be used by the internal monitoring server 103 to verify the theft tracking device 105 that transmitted the data, which is described herein above.

Note that the alarm is configured to make a sound. This sound may be initiated by LEOs through the LEO GUI. This will aid in the location of the item being tracked.

Note that as will be described further herein, the theft tracking device 105 is permanently affixed to the item that is to be tracked. In this regard, it will be difficult for the thief to remove from the item that is being tracked.

FIG. 4A is a top cut-away view of an exemplary theft tracking device 105 in accordance with an embodiment of the present disclosure. The theft tracking device 105 is configured into substantially square to rectangular shaped case 401. However, note that the case may be other shapes in other embodiments of the system 100. Within the case is a substantially square to rectangular shaped cavity 407.

The theft tracking device 105 comprises a PCMCIA card 402. On the card 402 reside the components and elements described with reference to FIG. 3A.

The card 402 is of the same shape as the case and comprises a slot 403. The slot 403 is on the insertion end of the card 402. The card 402 is inserted into the substantially square to rectangular shaped slot in a direction shown by reference arrows 590 and 591.

When the PCMCIA card 402 is fully inserted into the cavity 406, the slot 403 makes physical and electrical contacts with the plug 404. Note that the plug 404 comprises inward mechanical protrusions that indicate electrical connections when manipulated and designate whether the device is a remote locator 104 or a theft tracking device 105. When the PCMCIA card 402 is inserted, it sits flush with the case when fully inserted.

Further, traversing along each side of the case 401 is a battery backup 410. The battery backup 410 provides power to the components and elements on the PCMCIA card 402.

FIG. 4B is a side view of the theft tracking device 105 showing the PCMCIA card 402 fully inserted into the cavity 407 (FIG. 4B). The case 401 surrounds the PCMCIA card. Further, plug 404 is inserted in slot 403.

Note that there is a power in plug 405 and a power out plug 406. The power in plug 405 is configured to interface with a power source, e.g., a receptacle that provides power to the tracked item through the tracking device 105. An adapter (not shown) is coupled to the power in plug 405, which allows the electrical connection from the tracked items wall receptacle power cord to the theft tracking device 105. The power provided through the plug 405 traverses the theft tracking device 105 and power is output at the plug 406. There is a second adapter (not shown) that couples the power out plug 406 to the power system of the tracked item. Thus, if a thief attempts to remove the theft tracking device 105 from the item being tracked, the electrical connection pass-through of the item being tracked is permanently disable and the item is unusable by the thief.

FIG. 4C is an end view of the theft tracking device 105 showing the PCMCIA card 402 fully inserted into the cavity 407 (FIG. 4B). The case 401 holds the PCMCIA card and its associated components and elements.

Further shown is the input power plug 405 and the output power plug 406. As discussed, an adapter (not shown) electrically couples the power in plug 405 to a wall receptacle (not shown). Further the power output plug 406 is electrically coupled to the item via another adapter (not shown). The power provided through plug 405 charges the battery backup 410 (FIG. 4A) while also providing power through the theft tracking device 105 to the item being tracked.

FIG. 5A is a top cut-away view of an exemplary remote locator 104 in accordance with an embodiment of the present disclosure. The remote locator 104 is configured into substantially square to rectangular shaped case 500. Within the case is a substantially square to rectangular shaped cavity 501.

The remote locator 104 comprises a PCMCIA card 502. On the card 502 resides the components and elements described with reference to FIG. 3B.

The card 502 is square to rectangular shaped and comprises a slot 504. The slot 504 is on the insertion end of the card 502. The card 502 is inserted into the substantially square to rectangular shaped slot in a direction shown by reference arrows 408 and 409.

When the PCMCIA card 502 is fully inserted into the cavity 501, the slot 504 makes physical and electrical contacts with the plug 503. Note that the plug 503 comprises inward mechanical protrusions that indicate electrical connections when manipulated that designate whether the device is a remote locator 104 or a theft tracking device 105. When the PCMCIA card 502 is inserted, it sits flush with the case when fully inserted.

Further, traversing along each side of the case 500 is a battery backup 508. The battery backup 508 provides power to the components and elements on the PCMCIA card 502.

FIG. 5B is a side view of the remote locator 104 showing the PCMCIA card 502 fully inserted into the cavity 501 (FIG. 5B). The case 500 surrounds the PCMCIA card 502. Further, plug 503 is coupled to slot 504 when the PCMCIA card 502 is fully inserted into the cavity 501.

Note that there are electrical plugs 507. These plugs are configured to fit and insert into a standard electrical receptacle during operation.

FIG. 5C is an end view of the remote locator 104 showing the PCMCIA card 502 fully inserted into the cavity 501 (FIG. 5C). The case 500 holds the PCMCIA card and its associated components and elements. Further, FIG. 5C shows the electrical plugs 507 that are inserted into a standard receptacle during operation.

Figure 6:
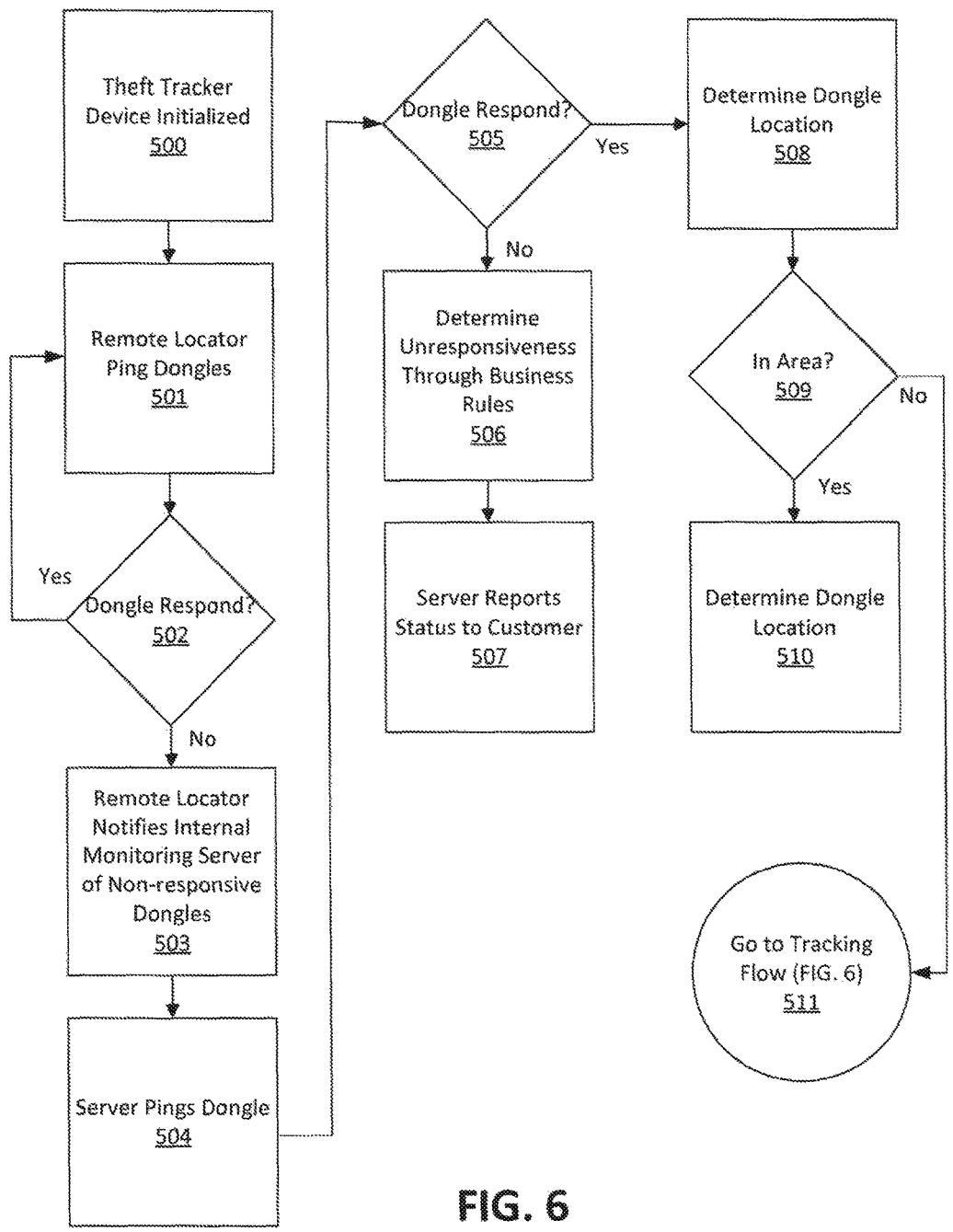
FIG. 6 is exemplary architecture and functionality of monitoring of the theft tracking system of FIG. 1.

FIG. 6 is exemplary architecture and functionality of the theft tracking system 100 in accordance with an embodiment of the present disclosure.

In step 500, the theft tracker device 105 (FIG. 3B) is initialized. A user enters identifying information on the external server 106, which is stored in the data storage server 107 (FIG. 1). The data storage server 107 looks up a serial number of the theft tracking device 105 to determine if the serial number is valid. Further, initialization occurs when the theft tracking device 105 transmits a SIM identifier and a public key to the remote locator 104 (FIG. 3A). The public key and SIM is provided to the internal monitoring server 103 (FIG. 1). The public keys are used by the internal monitoring server 103 to decrypt messages sent from the theft tracking device 105.

In step 501, the remote locator 104 pings each of the theft tracking devices 105 within the subnet 102 (FIG. 1). As noted, a ping is simply a message sent to the theft tracking device 105 requesting a response. When the theft tracking device 105 returns a message in response to the ping in step 502, the remote locator 104 continues to ping the theft tracking devices 105 at set time intervals.

If the theft tracking device 105 does not respond, the remote locator 104 pings the theft tracking devices again in step 503. If there is still no response from the theft tracking device 105, the remote locator 104 contacts the internal monitoring server 103. The internal monitoring server 103 pings the theft tracking device 105 in step 504.

If the theft tracking device 105 does not respond to the internal monitoring server 103, the internal monitoring server 103 performs certain business rules in step 506. As examples, the internal monitoring server 103 contacts the customer of the unresponsiveness and provides potential causes. The theft tracking device 105 determines its location and reports to the internal monitoring server 103. The theft tracking device 105 reports status of the theft tracking device 105, i.e., if the theft tracking device 105 is moving. If the theft tracking device 105 is moving, tracking of the theft tracking device 105 initiates and the theft tracking system 100 begins monitoring the movement. In step 507, the internal monitoring server 103 reports status to the customer. This status information does not include tracking data.

If the theft tracking device 105 responds in step 505 to the message from the internal monitoring server 103, the location of the theft tracking device 105 is determined in step 508. Notably, the theft tracking device 105 uses its GPS 225 to determine its location and transmits its location data through its Wi-Fi module 224 or via cell communications through the GSM 230.

In step 509, if it is determined that the theft tracking device 105 is near the remote locator 104, the theft tracking device 105 determines its location and reports this location back to the remote locator 104, which can then communicate the status with the internal monitoring server 103.

In step 509, if it is determined that the theft tracking device 105 is not near the remote locator 104, the tracking begins in step 511, which is shown in FIG. 6.

In step 600, the theft tracking device 105 turns on its cellular devices. In step 601 tracking is initialized, and the theft tracking device 105 pings the remote locator 104. If the remote locator 104 is in range in step 603, the theft tracking device 105 continues to ping the remote locator 104.

In step 603, if the remote locator 104 is not in range in step 603, the theft tracking device 105 contacts the internal monitoring server 103, via internet messaging to contact the customer. The customer determines whether to dismiss the message or track the item to which the theft tracking device 105 is attached.

If the customer elects to track in step 605, the internal monitoring server 103 directs the customer to contact LEOs and file a theft/LEO report in step 606. A LEO fills out the information requested on the LEO GUI of the external server 106. From the information entered, in step 607 the internal monitoring server 103 obtains the text cellular number or email address, and in step 608 obtains a LEO report/case number.

If the customer decides not to track (dismiss), the tracking method ends at terminator 616.

If the customer decides he/she desires to track the item to which the theft tracking device 105 is attached, the theft tracking device 105 obtains and transmits its GPS coordinates in step 609 to the internal monitoring server 103.

In step 610, the remote locator 104 creates a data pack containing the information for tracking the theft tracking device 105, and in step 611 sends the data pack to the internal monitoring server 103. In step 612, the remote locator 104 sends a message to the theft tracking device's 105 cell system to go into idle mode.

During communication between the remote locator 104 and the theft tracking device 105 if the theft tracking device 105 is moving steps 609-612 are re-executed. If the theft tracking device 105 stops moving, the internal monitoring server 103 sends a mobile Web page link to LEOs in step 614. This contains information about the whereabouts of the theft tracking device 105. In step 615 the internal monitoring server 103 processes the LEO Web page response. The tracking method ends at terminator 616.

Figure 8:
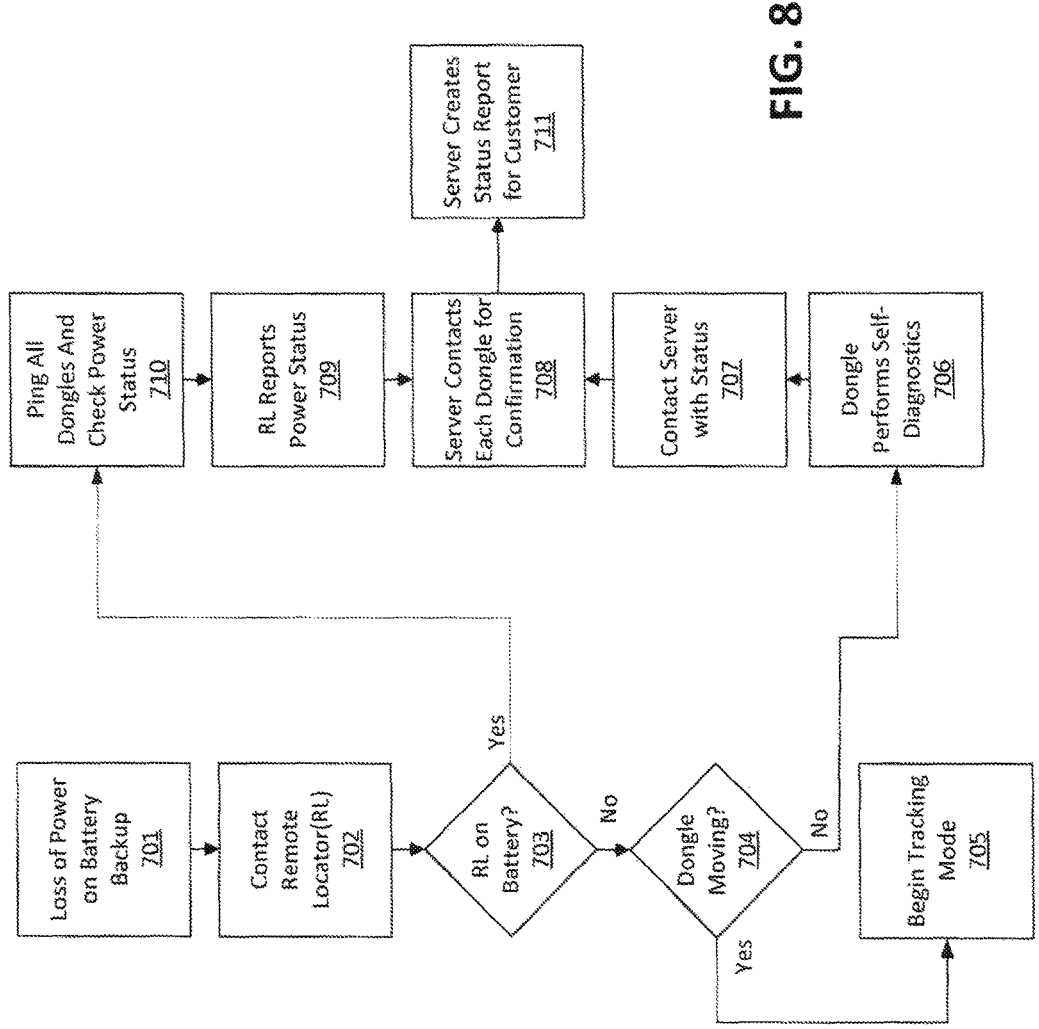
FIG. 8 is exemplary architecture and functionality of the power loss of the theft tracking device of the system such as is depicted in FIG. 1.

FIG. 8 depicts architecture and functionality of a loss of power process to be executed when power is lost to the theft tracking device 105 and/or the remote locator 104.

In step 701, there is a loss of power and the remote locator 104 and the theft tracking device 105 go to backup power. If there is no movement, the loss of power could be a result of a loss of power to the residence or business where the remote locator 104 and the theft tracking device 105 reside.

In step 702, the theft tracking device 105 transmits a message to the remote locator 104. If the remote locator 104 is not running on battery in step 703, the remote locator 104 determines if the theft tracking device 105 is moving by pinging the theft tracking device 105. If the theft tracking device does not respond, it is out of its designated location.

Figure 7:
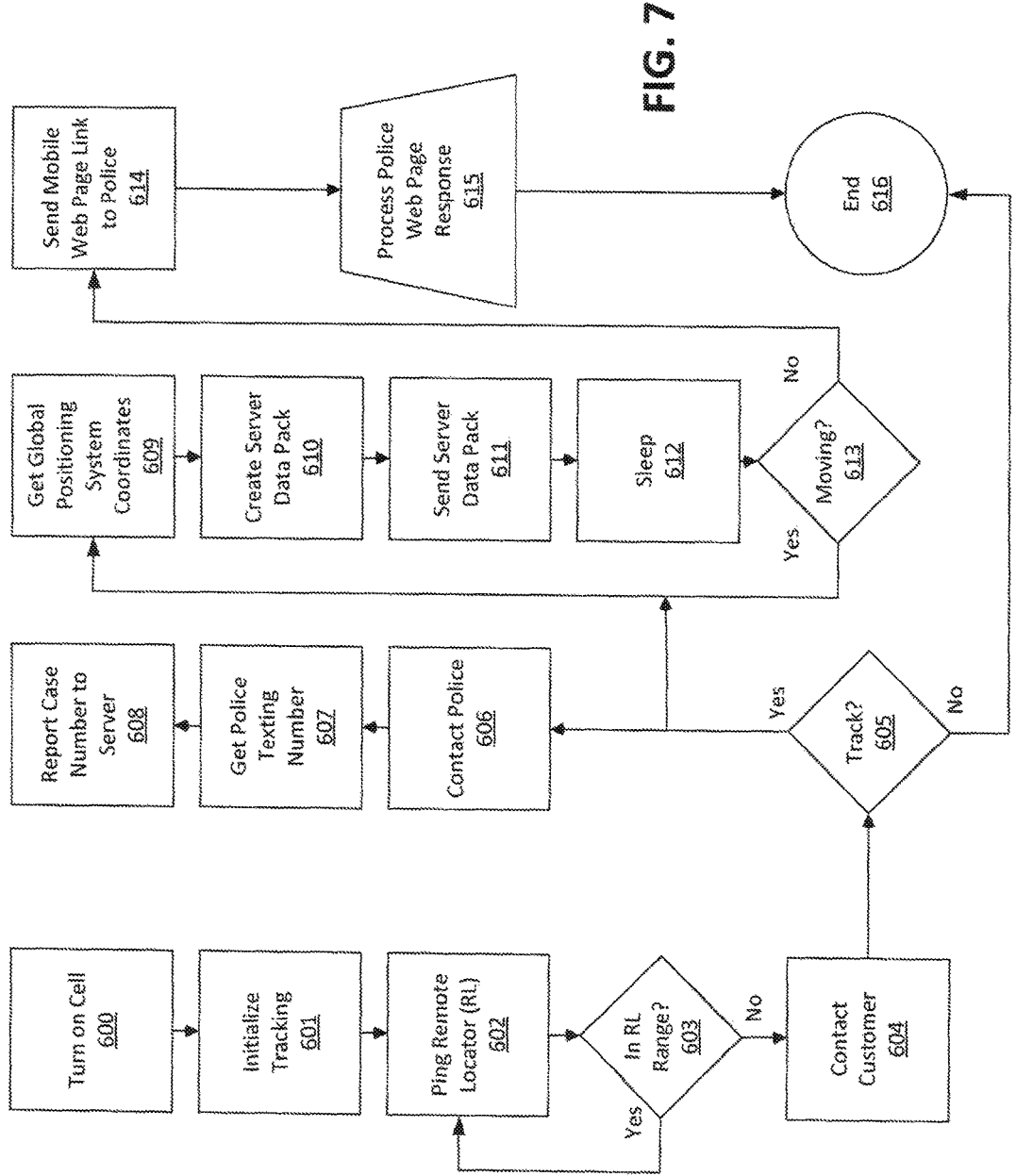
FIG. 7 is exemplary architecture and functionality of the theft tracking system such as is depicted in FIG. 1.

If the theft tracking device 105 is moving, tracking mode begins as indicated in FIG. 7 in step 704.

If the theft tracking device 105 is not moving, the theft tracking device 105 performs self-diagnostics in step 706. In step 707, the remote locator 104 contacts the internal monitoring server 103 and transmits data indicative of the self-diagnostics and status information to the internal monitoring server 103. Note that the data transmitted travels through the subnet 102, the private network 109, the WWW 101 to the external server 106. The external server 106 transmits the data to the internal monitoring server 103.

In step 708, the remote locator 104 contacts each theft tracking device 105 for confirmation. In step 709, the remote locator 104 sends a status to the internal monitoring server 103. In step 708, the internal monitoring server 103 contacts each theft tracking device 105 for confirmation. In step 711, the internal monitoring server 103 creates a status report for customers. This status information does not include tracking data.

If in step 703 the remote locator 104 battery is on, the remote locator 104 pings all the theft tracking devices 105 and checks power status. In step 709, the remote locator 104 transmits a report of status to the internal monitoring server 103.

In step 708, the internal monitoring server 103 contacts each theft tracking device 105 for confirmation. In step 711, the internal monitoring server 103 creates a status report for customers. This status information does not include tracking data.

FIG. 9A depicts a top perspective view of an exemplary theft tracking device 900 that may be used in the theft tracking system 100 depicted in FIG. 1. The theft tracking device 900 is substantially like the theft tracking device 105 (FIG. 3B). However, the theft tracking device 900 comprises a Universal Serial Bus (USB) port 1001 as opposed to power being provided by alternating current, as is depicted in FIG. 3B.

The USB port 1001 receives a USB cable (not shown). The USB cable provides one-way power into the theft tracking device 900. In one embodiment, the power provided is a 5 Volt USB power source. As will be described further, the power provided by the USB cable through the USB port 1001 provides power to the theft tracking device 900 and charges batteries on the theft tracking device 900.

Note that the theft tracking device 900 does not allow power to run to an attached item, e.g., a television, stereo, digital versatile disc (DVD), digital video recorder (DVR), computer, etc. In this regard, the theft tracking device 900 is configured to be attached to items that do not require power, e.g., paintings, which will be described further herein.

The exemplary theft tracking device 900 further comprises points 901-904 that extend from the corners of the theft tracking device 900. The points 901-904 may be rigid and comprised of a hard plastic or the like. Note that often communication devices are covered in a conductive material, e.g., foil, to prohibit communication. This is referred to as a Faraday cage. The points 901-904 are configured to penetrate any material that may be placed around the theft tracking device 900 to prohibit communication. Even the slightest tear in the material because of the one or more points 901-904 will allow communication.

FIG. 9B is a perspective view of the bottom of the theft tracking device 900. Note that the points 901, 903, and 904 are shown, which are configured to defeat a Faraday cage and allow communication. Also, the USB port 1001 is shown on the theft tracking device 900 for receiving power from a USB cable (not shown).

Additionally, on a bottom face of the theft tracking device is a chemical welding surface 905. Note that the chemical welding surface 905 may be partially liquified via a solvent. Once liquified, the chemical welding surface 905 may be adhered to an item that is to be tracked. This permanently adheres the theft tracking device 900 to the item that is to be tracked.

Figure 10A:
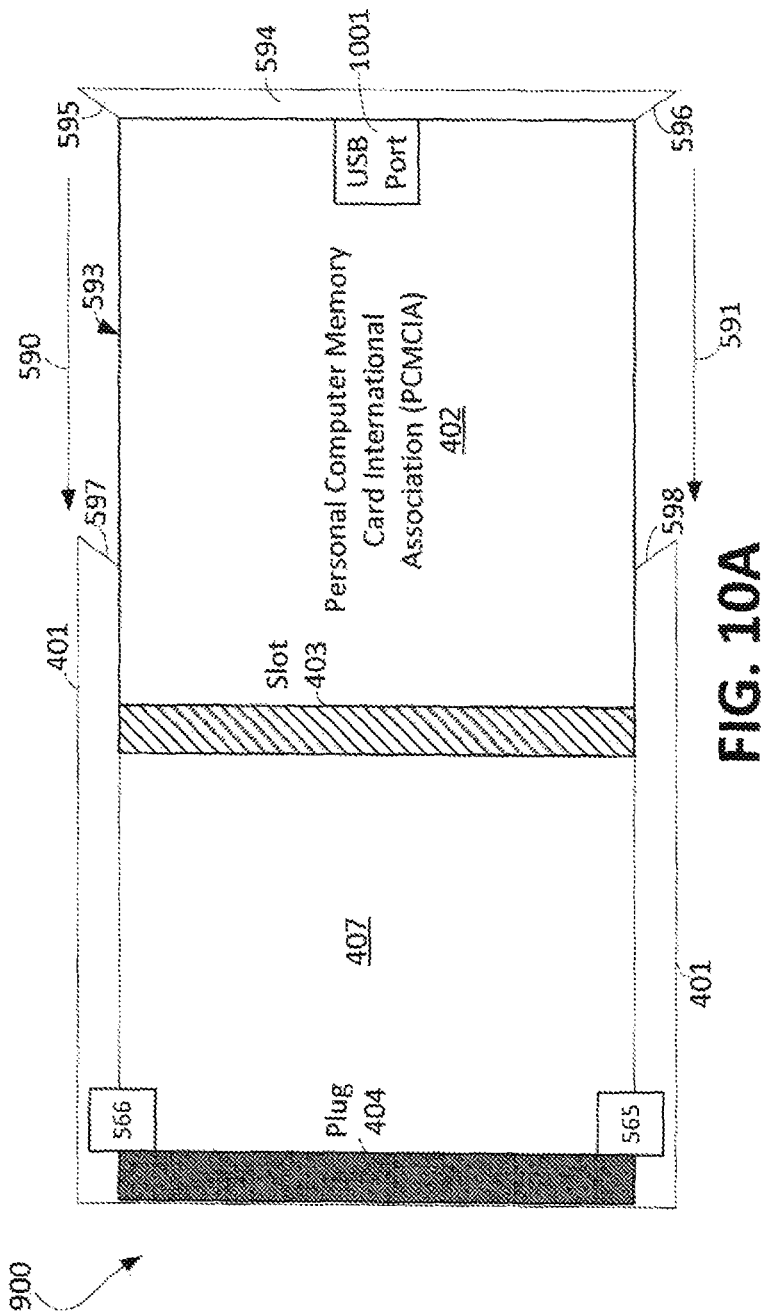
FIG. 10A is a top cut-away view of an exemplary theft tracking device such as is depicted in FIG. 9A showing an exemplary Personal Computer Memory Card International Association (PCMCIA) card being inserted into a case.

FIG. 10A is a top cut-away view of an exemplary theft tracking device 900 in accordance with an embodiment of the present disclosure. Note that the theft tracking device 900 functions substantially like the theft tracking device 105 described with reference to FIG. 4A-4C, and like numerals are used to describe those components of the theft tracking device 900 that are like those of the theft tracking device 105.

In this regard, the theft tracking device 900 is a substantially square to rectangular-shaped case 401. However, note that the case may be other shapes in other embodiments of the theft tracking system 100. Within the case 401 is a substantially square to rectangular shaped cavity 407.

The theft tracking device 900 comprises a carriage 593. The carriage is shown in FIG. 10A as it is being inserted into the cavity 407. The PCMCIA card 402 is removeably coupled to the carriage 593. On the PCMCIA card 402 reside the components and elements described with reference to FIG. 3A. Note that the PCMCIA card 402 is removeably coupled to the carriage 593 so that the PCMCIA card 402 may be easily replaced if the PCMCIA card 402 malfunctions.

The PCMCIA card 402 is of the same general shape as the carriage 593 and comprises a slot 403. The slot 403 is on the insertion end of the card 402. The carriage 593 is inserted into the substantially square to rectangular-shaped cavity 407 in a direction shown by reference arrows 590 and 591.

When the carriage 593 is fully inserted into the cavity 407, the slot 403 makes physical and electrical contact with the plug 404. Note that in one embodiment the plug 404 comprises male mechanical protrusions that indicate electrical connections that when manipulated may designate whether the device is a remote locator 104 or a theft tracking device 105.

When the carriage 593 is fully inserted, it sits flush with the case 401. In this regard, the carriage 593 comprises a beveled face 594 that comprises bevels 593 and 596. When the carriage 593 is fully inserted, bevel 593 mates with a bevel 597 of the case 401, and bevel 596 mates with bevel 598 to create a tight enclosure holding the carriage 593 in place.

Furthermore, the theft tracking device 900 comprises one or more actuators 566, 565. Once the carriage 593 is fully inserted into the cavity 407, a user may release the carriage 593 from the theft tracking device 900.

Additionally, the theft tracking device 900 comprises a USB port 1001. A USB cable (not shown) connects to the USB port 1001. The USB cable provides power to the theft tracking device 900. Further, the power provided by the USB cable charges the batteries (shown in FIG. 10B) so that the theft tracking device 900 will still operate if power is lost through the USB cable.

Figure 10B:
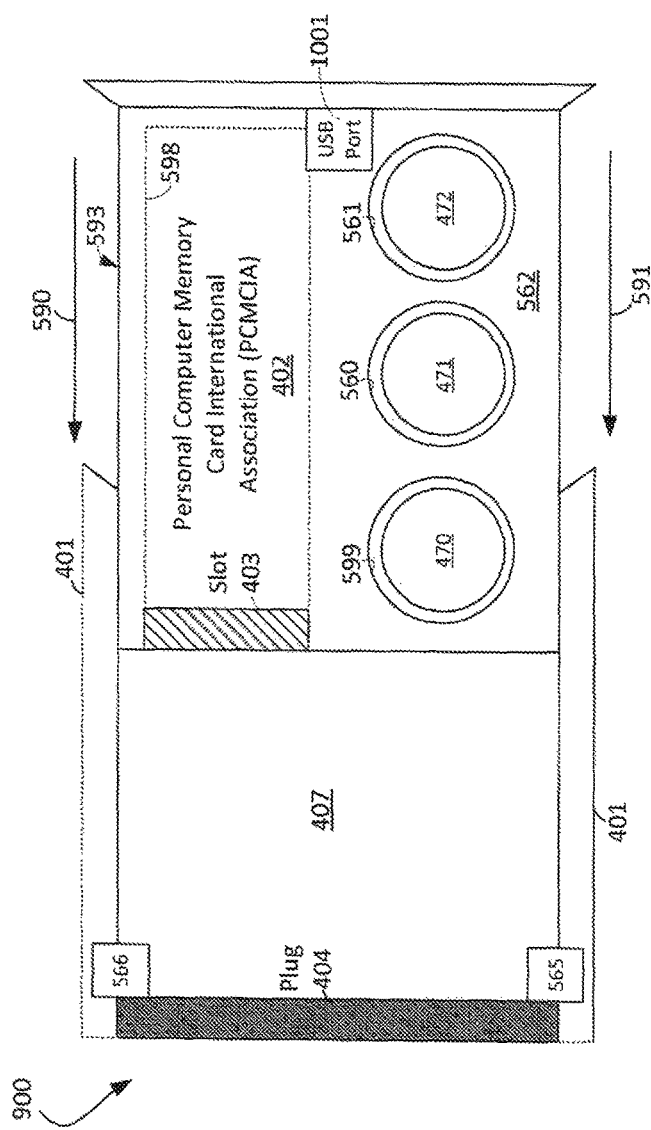
FIG. 10B is a bottom cut-away view of the theft tracking device such as is depicted in FIG. 10A.

FIG. 10B is a bottom cut-away view of the exemplary theft tracking device 900. FIG. 10B shows the carriage 593 being inserted into the rectangular-shaped cavity 407 as indicated by reference arrows 590 and 591. When fully inserted, the slot 403 couples with the plug 404.

The carriage 593 further comprises a plurality of openings 599-561. In this regard, a plurality of batteries 470-472 attach to the bottom face 562 of the carriage 593 and are easily accessible for replacement through the openings 599-561. Note that the PCMCIA card 402 can be seen through a window 598 on the bottom face 562 of the carriage 593. While three batteries 470-472 are shown in three openings 599-561, respectively, any number of batteries and openings may be used in other embodiments.

Figure 10D:
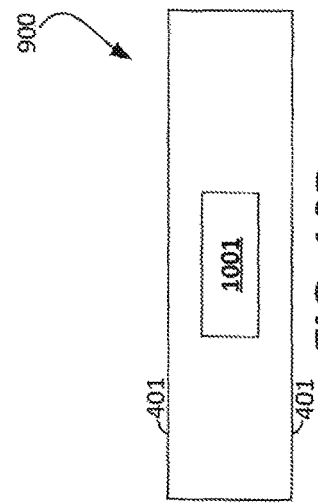
FIG. 10D is an end view of the theft tracking device such as is depicted in FIG. 10A.
Figure 10C:
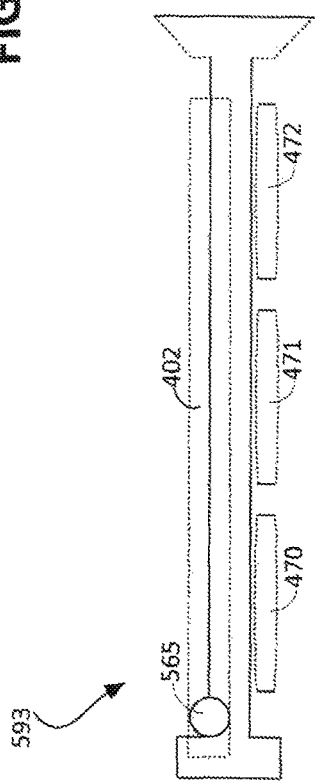
FIG. 10C is a cross-sectional side view of the theft tracking device such as is depicted in FIG. 10A.

FIG. 10C is a side view of the carriage 593. As shown, the PCMCIA card 402 couples to a top side of the carriage 593. Further, the batteries 470-472 couple to an underside of the carriage 593. The side view further shows one of the actuators 565 for releasing the carriage to replace a PCMCIA card 402 or the batteries 470-474.

FIG. 10D is front view of the theft tracking device 900. The theft tracking device 900 comprises the USB port 1001 for receiving a USB cable as described hereinabove. As discussed, an adapter (not shown) electrically couples the USB cable to a wall receptacle (not shown). The power provided through USB cable charges the batteries 470-472 (FIG. 10B) while also providing power to the theft tracking device 900.

Figure 11:
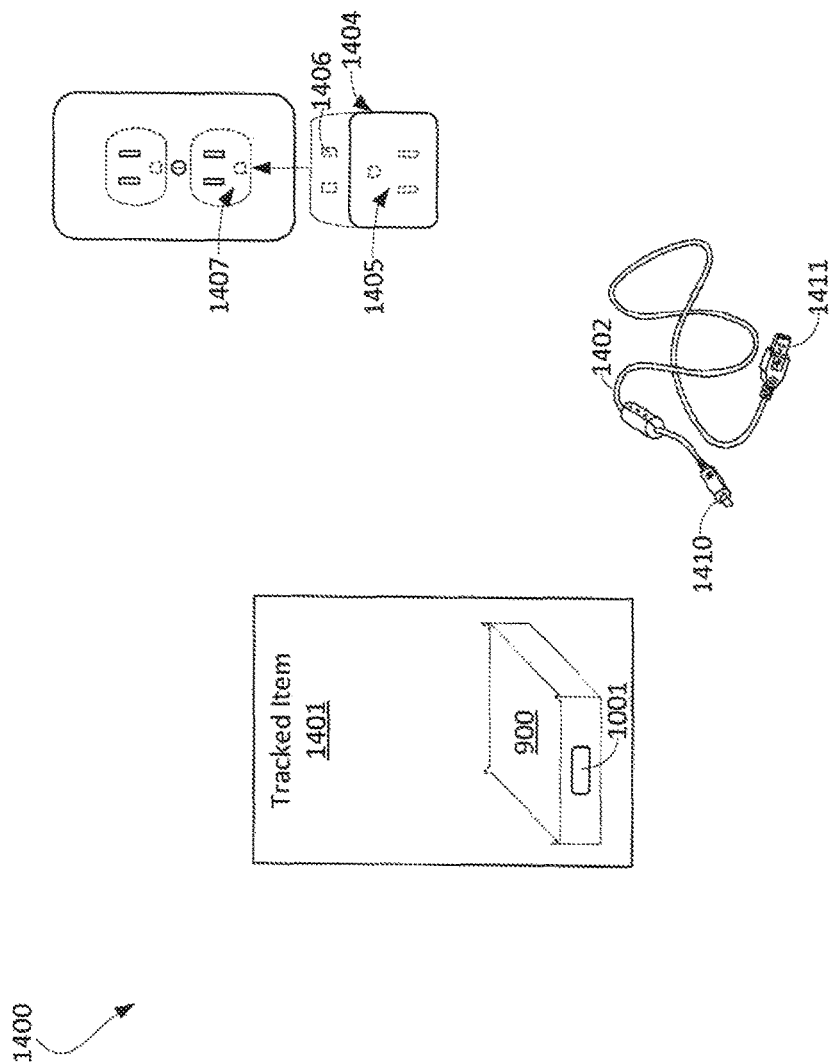
FIG. 11 depicts an exemplary set up of a system using the theft tracking device such as is depicted in FIG. 9A.

FIG. 11 depicts an exemplary theft tracking system 1400 for tracking an item 1401. Note that in one embodiment, the tracked item 1401 may require power, e.g., a television, a computer, or the like. If so, power may be provided via a power cable (not shown) that plugs into a power receptacle 1405. In another embodiment, the tracked item 1401 may not require power, e.g., a painting, or the like.

A theft tracking device 900 is permanently affixed to the tracked item 1401 via a chemical weld, as described hereinabove. Note that using a chemical weld is merely exemplary. Other methods for permanently affixing the theft tracking device 900 to the tracked item 1401 may be used in other embodiments.

The USB port 1001 of the theft tracking device 900 receives a plug 1410 of a USB cable 1402. The other end of the USB cable 1402 comprises a plug 1411 that is inserted into a USB port 1406. The USB cable 1402 provides power to the theft tracking device 900 that is used to operate the theft tracking device 900 and to charge the batteries 470-472 (FIG. 10B) of the theft tracking device 900.

Note that the theft tracking device 900 operates substantially like the theft tracking device 105 (FIG. 3B). In this regard, the theft tracking device is communicatively coupled to the remote locator 104 (FIG. 3A).

If power is lost to the theft tracking device 900, the theft tracking device 900 immediately switches to battery backup 410. The theft tracking device 900 pings the remote locator 104 to determine if the remote locator 104 is on battery backup power as well and is in the predetermined range of the theft tracking device 900.

If the remote locator 104 is in range of the theft tracking device 900, the theft tracking device 900 continues to contact the remote locator 104 periodically. If the remote locator 104 is not within range of the theft tracking device 900, the theft tracking device 105 initiates its cell system and contacts the internal monitoring server 103 via Internet messaging with the theft tracking device's 900 status and location.

Further, the theft tracking device 900 performs self-diagnostics to determine the source of a problem on the theft tracking device 900. The theft tracking device 900 contacts the internal monitoring server 103 with its status via its cell system using internet messaging protocols.

Additionally, the internal monitoring server 103 contacts the customer to request to track or disregard theft tracking device 900. If the customer chooses to disregard, the internal monitoring server 103 sends a message to the theft tracking device 900 to go into idle mode. Also, the message directs the theft tracking device 900 to recharge the battery once power is re-established.

If the customer chooses to track the theft tracking device 900, the internal server 103 initiates messaging with the theft tracking device 900 to initiate tracking mode. The internal server 103 contacts the customer requesting that the customer contact LEOs and file a theft/LEO report. Once the report is filed, a case number and a contact point/phone number for LEOs is obtained so that the theft tracking system 100 can communicate with LEOs on the location of the items that may have been stolen.

What we claim is:

1. A device tracking system, comprising:
    a theft tracking device configured for permanently securing to an item that has the propensity to be stolen, the theft tracking device comprising a theft tracking microcontroller and a Wireless Fidelity (Wi-Fi) module, the theft tracking device microcontroller configured for receiving ping data and in response transmitting response data via the Wi-Fi module;
    a remote locator device, which comprises only a case, a battery within the case, and a Personal Computer Memory Card International Association (PCMCIA) card inserted in the case and the PCMCIA card is only configured to receive data from the theft tracking device within an area and communicate through a router to access the Internet affixed to an outside surface of the case is a plug for securing the remote locator device to a power receptacle, such that the case of the remote locator device is directly adjacent the power receptacle the remote locator device comprising a remote locator microcontroller and a Wi-Fi module located on the PCMCIA card, the remote locator device microcontroller configured for periodically transmitting a ping to the theft tracking device and receiving the response data from the theft tracking device, the remote locator device further configured for transmitting data indicating that the theft tracking device is not responding via a network when a response is not received from the tracking device; and
    at least one server comprising a server processor, the at least one server communicatively coupled to the remote locator device, the server processor configured for receiving the data indicating that the theft tracking device is not responding, the server processor further configured to transmit location data periodically to a Law Enforcement Officer that shows a location of the item and displays the location on a map to a user.

2. The device tracking system of claim 1, wherein the theft tracking device is powered by an alternating current source.

3. The device tracking system of claim 1, the theft tracking device is powered by a universal serial bus (USB) cord electrically coupled to a power adapter.

4. The device tracking system of claim 1, wherein the theft tracking device comprises at least one rigid point extending from a corner of a housing of the theft tracking device.

5. The device tracking system of claim 1, wherein the item requires power.

6. The device tracking system of claim 1, wherein the theft tracking device comprises a carriage slidably coupled to a case of the theft tracking device.

7. The device tracking system of claim 6, wherein a personal computer memory card international association (PCMCIA) is removeably coupled to a top side of the carriage.

8. The device tracking system of claim 6, wherein one or more batteries is removeably coupled to an underside of the carriage.

9. The device tracking system of claim 6, wherein the theft tracking device comprises at least one actuator for removing the carriage from the case.

* * * * *